US011480755B2

(12) United States Patent
Tsai et al.

(10) Patent No.: US 11,480,755 B2
(45) Date of Patent: Oct. 25, 2022

(54) IMAGING LENS MODULE AND ELECTRONIC DEVICE

(71) Applicant: LARGAN PRECISION CO., LTD., Taichung (TW)

(72) Inventors: Chun-Hua Tsai, Taichung (TW); Ming-Ta Chou, Taichung (TW); Ming-Shun Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 324 days.

(21) Appl. No.: 16/892,411

(22) Filed: Jun. 4, 2020

(65) Prior Publication Data

US 2020/0292779 A1    Sep. 17, 2020

Related U.S. Application Data

(63) Continuation of application No. 16/128,598, filed on Sep. 12, 2018, now Pat. No. 10,712,527, which is a continuation of application No. 15/431,827, filed on Feb. 14, 2017, now Pat. No. 10,101,557.

(30) Foreign Application Priority Data

Nov. 4, 2016  (TW) ................................. 105136001

(51) Int. Cl.
  *G02B 7/02*  (2021.01)
  *H04N 5/225*  (2006.01)
(52) U.S. Cl.
  CPC ............. *G02B 7/025* (2013.01); *G02B 7/021* (2013.01); *H04N 5/2254* (2013.01)
(58) Field of Classification Search
  CPC ....... G02B 7/025; G02B 7/021; H04N 5/2254

USPC .......................................... 359/819, 821–830
See application file for complete search history.

(56) References Cited

U.S. PATENT DOCUMENTS

| 6,870,693 B2 | 3/2005 | Ito |
| 7,417,807 B2 | 8/2008 | Chiang |
| 7,419,315 B2 | 9/2008 | Hirata et al. |
| 7,428,111 B2 | 9/2008 | Shibata et al. |
| 7,502,183 B2 | 3/2009 | Jao et al. |

(Continued)

FOREIGN PATENT DOCUMENTS

| TW | 200842486 A | 11/2008 |
| TW | 201118446 A | 6/2011 |

(Continued)

*Primary Examiner* — William Choi
(74) *Attorney, Agent, or Firm* — McClure, Qualey & Rodack, LLP

(57) ABSTRACT

An imaging lens module includes a plastic barrel, an optical lens assembly and a glue material. The plastic barrel includes an outer object-end surface, an outer image-end surface and an inner tube surface. The inner tube surface connects the outer object-end surface and the outer image-end surface, and includes a plurality of parallel inner surfaces. A plurality of stripe structures are disposed on and protruded from at least one of the parallel inner surfaces, wherein the stripe structures are regularly arranged along a circumferential direction of the parallel inner surface. The optical lens assembly includes a plurality of optical elements disposed in the plastic barrel and arranged along the optical axis, wherein an outer annular surface of at least one of the optical elements is disposed correspondingly to the stripe structures. The glue material is applied among the outer annular surface and the stripe structures.

21 Claims, 33 Drawing Sheets

(56) References Cited

U.S. PATENT DOCUMENTS

| | | |
|---|---|---|
| 7,626,773 B2 | 12/2009 | Noda et al. |
| 7,639,435 B2 | 12/2009 | Chiang |
| 7,663,812 B2 | 2/2010 | Chang |
| 7,929,231 B2 | 4/2011 | Chang |
| 8,014,655 B2 | 9/2011 | Chang et al. |
| 8,098,436 B2 | 1/2012 | Wang et al. |
| 8,264,786 B2 | 9/2012 | Lee |
| 8,270,101 B2 | 9/2012 | Huang |
| 8,479,901 B2 | 7/2013 | Engelmann et al. |
| 8,736,989 B2 | 5/2014 | Wu |
| 9,160,221 B2 | 10/2015 | Takashima |
| 9,354,444 B2 | 5/2016 | Lin |
| 9,904,050 B2 | 2/2018 | Lin et al. |
| 10,101,557 B2 | 10/2018 | Tsai et al. |
| 2018/0024312 A1 | 1/2018 | Wei |

FOREIGN PATENT DOCUMENTS

| | | |
|---|---|---|
| TW | 201122599 A | 7/2011 |
| TW | M481412 U | 7/2014 |
| TW | M517334 U | 2/2016 |
| TW | M519748 U | 4/2016 |
| TW | M519751 U | 4/2016 |
| TW | M529856 U | 10/2016 |
| TW | M531602 U | 11/2016 |

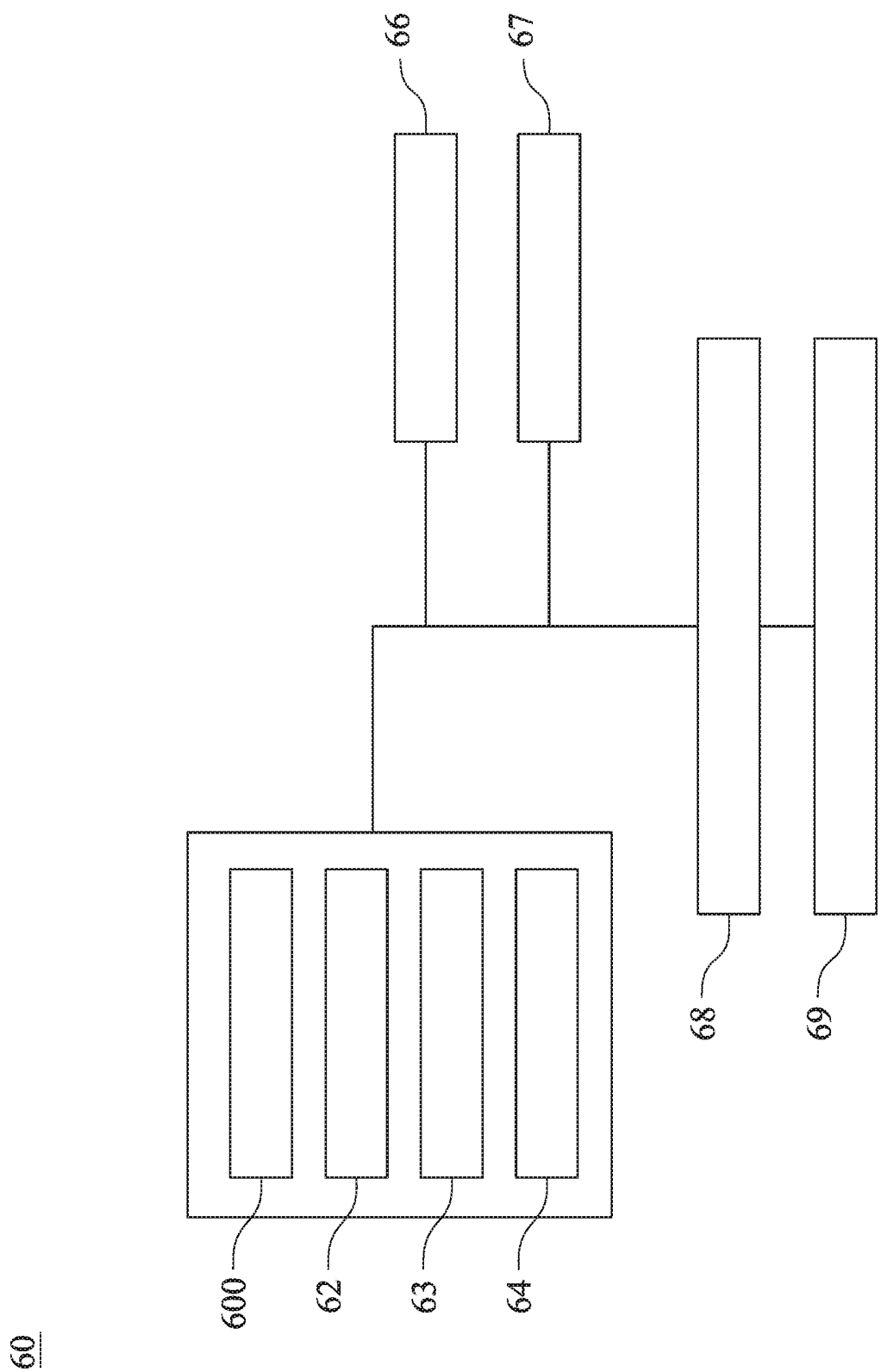

IMAGING LENS MODULE AND ELECTRONIC DEVICE

RELATED APPLICATIONS

The present application is a continuation of the application Ser. No. 16/128,598, filed on Sep. 12, 2018, which is a continuation of the application Ser. No. 15/431,827, filed on Feb. 14, 2017, U.S. Pat. No. 10,101,557 issued on Oct. 16, 2018, and claims priority to Taiwan application serial number 105136001, filed on Nov. 4, 2016, the entire contents of which are hereby incorporated herein by reference.

BACKGROUND

Technical Field

The present disclosure relates to an imaging lens module. More particularly, the present disclosure relates to an imaging lens module which is applicable to portable electronic devices.

Description of Related Art

Along with the popularization of personal electronic products and mobile communication products (such as mobile phones and tablets) having imaging devices, miniaturized imaging lens modules have been correspondingly risen and developed, and the demands of miniaturized imaging lens modules having high resolution and great imaging quality significantly increased as well.

During the assembling process of imaging lens modules, the glue materials are generally applied between the plastic barrel and optical elements to fix the location of the optical elements or the entire optical lens assembly. However, the narrow gap and the shaping surface properties between the plastic barrel and the optical elements increase the difficulty of applying the glue materials, and even the appearances of the imaging lens modules are affected by the bumps caused by the partially overflowed glue materials. Therefore, an imaging lens module with a controllable application range of glue materials, while facilitating uniform application of the glue materials and satisfying demands of mass productions is urgently needed.

SUMMARY

According to one aspect of the present disclosure, an imaging lens module includes a plastic barrel, an optical lens assembly, and a glue material. The plastic barrel includes an outer object-end surface, an outer image-end surface, and an inner tube surface. The outer object-end surface is a surface of the plastic barrel facing an imaged object, and the outer object-end surface surrounds an object-end opening. The outer image-end surface is a surface of the plastic barrel facing an image surface, and the outer image-end surface surrounds an image-end opening. The inner tube surface connects with the outer object-end surface and the outer image-end surface and faces an optical axis of the imaging lens module. The inner tube surface includes a plurality of parallel inner surfaces, and vertical distances between all locations of each of the parallel inner surfaces and the optical axis are the same. A plurality of stripe structures are disposed on and protruded from at least one of the parallel inner surfaces, and the stripe structures are regularly arranged along a circumferential direction of the at least one of the parallel inner surfaces. The optical lens assembly includes a plurality of optical elements disposed in the plastic barrel and arranged along the optical axis. An outer annular surface of at least one of the optical elements is disposed correspondingly to the stripe structures. A glue material is applied among the outer annular surface and the stripe structures.

According to another aspect of the present disclosure, an electronic device includes the aforementioned imaging lens module and an image sensor, wherein the image sensor is disposed on the image surface of the imaging lens module.

According to another aspect of the present disclosure, an imaging lens module includes a plastic barrel, an optical lens assembly, and a glue material. The plastic barrel includes an outer object-end surface, an outer image-end surface, and an inner tube surface. The outer object-end surface is a surface of the plastic barrel facing an imaged object, and the outer object-end surface surrounds an object-end opening. The outer image-end surface is a surface of the plastic barrel facing an image surface, and the outer image-end surface surrounds an image-end opening. The inner tube surface connects with the outer object-end surface and the outer image-end surface and faces an optical axis of the imaging lens module. The inner tube surface includes a plurality of parallel inner surfaces, and vertical distances between all locations of each of the parallel inner surfaces and the optical axis are the same. The optical lens assembly includes a plurality of optical elements disposed in the plastic barrel and arranged along the optical axis, wherein a plurality of stripe structures are disposed on and protruded from an outer annular surface of at least one of the optical elements, and the stripe structures are regularly arranged along a circumferential direction of the outer annular surface, and at least one of the parallel inner surfaces is disposed correspondingly to the stripe structures. A glue material is applied among the parallel inner surfaces and the stripe structures.

According to another aspect of the present disclosure, an electronic device includes the aforementioned imaging lens module and an image sensor, wherein the image sensor is disposed on the image surface of the imaging lens module.

BRIEF DESCRIPTION OF THE DRAWINGS

The present disclosure can be more fully understood by reading the following detailed description of the embodiment, with reference made to the accompanying drawings as follows:

FIG. 10 is a 3-D view of the imaging lens module according to the 1st embodiment;

FIG. 6C is a block view of the electronic device according to the 6th embodiment;

DETAILED DESCRIPTION

1st Embodiment

Figure 1A:
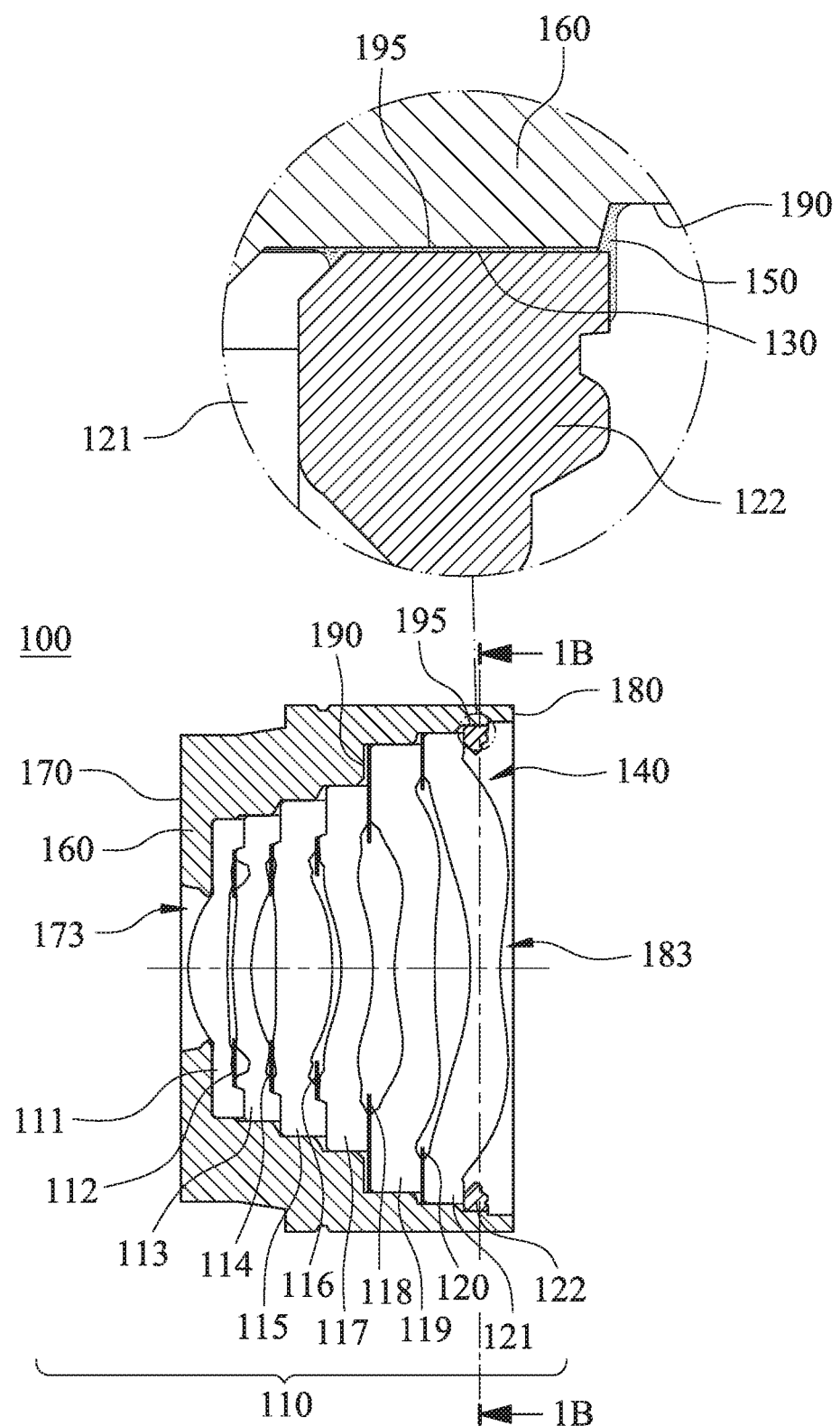
FIG. 1A is a schematic view of an imaging lens module according to the 1st embodiment of the present disclosure.
Figure 1B:
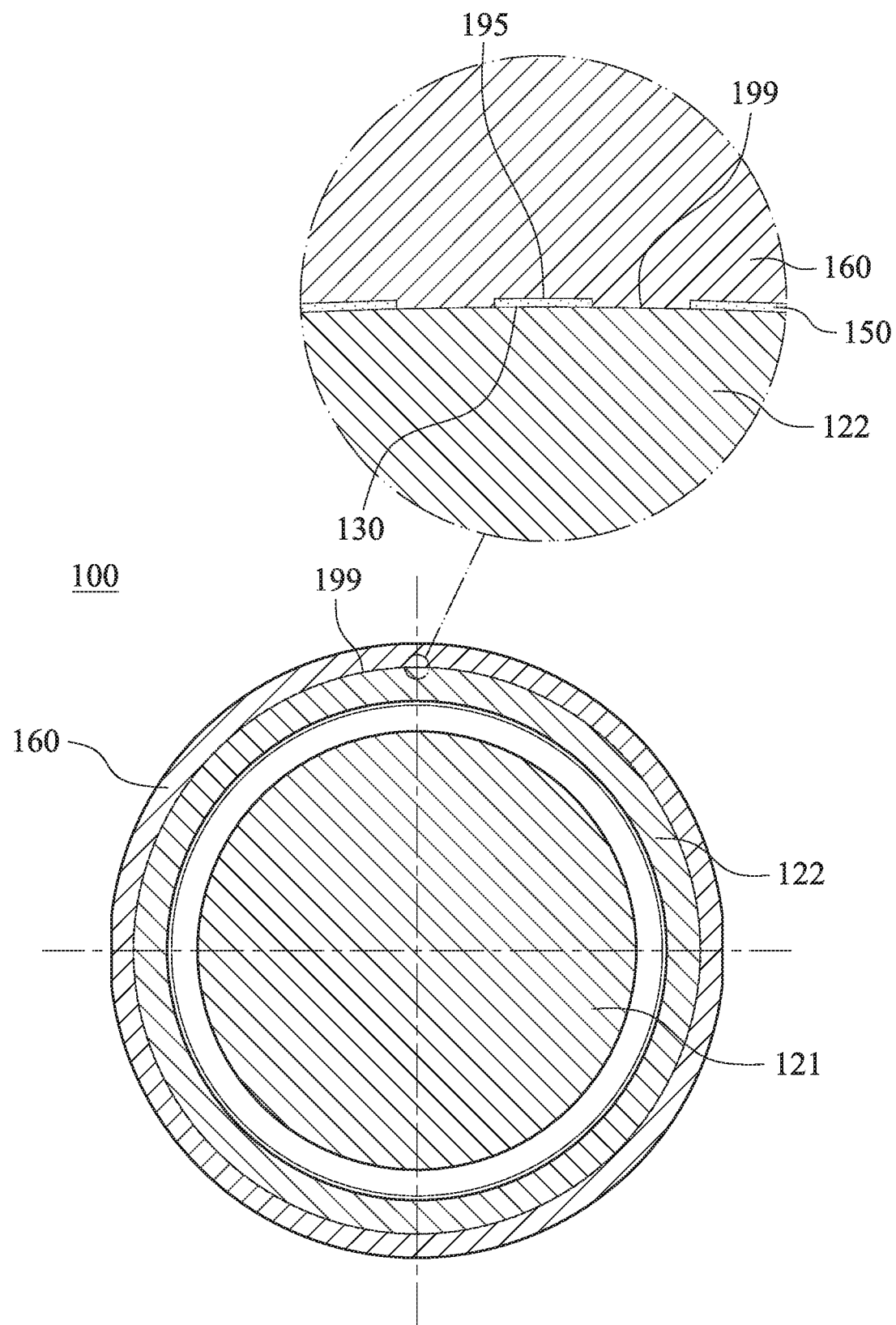
FIG. 1B is a cross-sectional view according to the cross-sectional line 1B-1B of FIG. 1A.

FIG. 1A is a schematic view of an imaging lens module 100 according to the 1st embodiment of the present disclosure, and FIG. 1B is a cross-sectional view according to the cross-sectional line 1B-1B of FIG. 1A. In FIG. 1A and FIG. 1B, the imaging lens module 100 includes an optical lens assembly 110, a plastic barrel 160, and a glue material 150. The imaging lens module 100 can further include a filter (not shown) and an image surface (not shown).

Figure 1C:
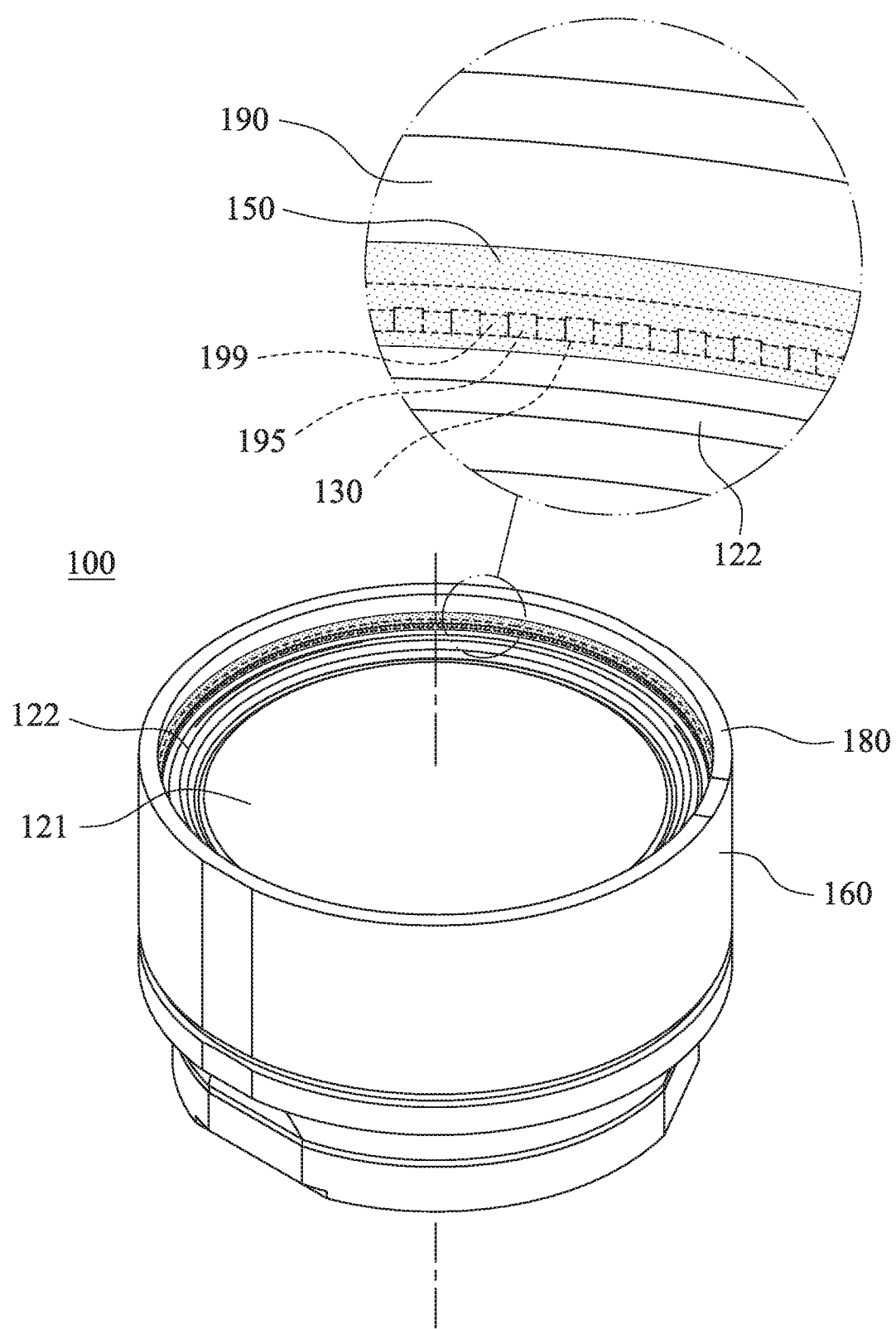
FIG. 1D is an exploded view of the plastic barrel and the optical lens assembly according to the 1st embodiment.
FIG. 1E is a 3-D view of the plastic barrel according to the 1st embodiment.
FIG. 1F is a schematic view of the plastic barrel according to the 1st embodiment.
FIG. 1G is a plane view of the plastic barrel according to the 1st embodiment.
FIG. 1H is a schematic view of the stripe structures and the optical element according to the 1st embodiment.
FIG. 1I is a schematic view of applying the glue material according to the 1st embodiment.
FIG. 1J is another schematic view of applying the glue material according to the 1st embodiment.
Figure 1D:
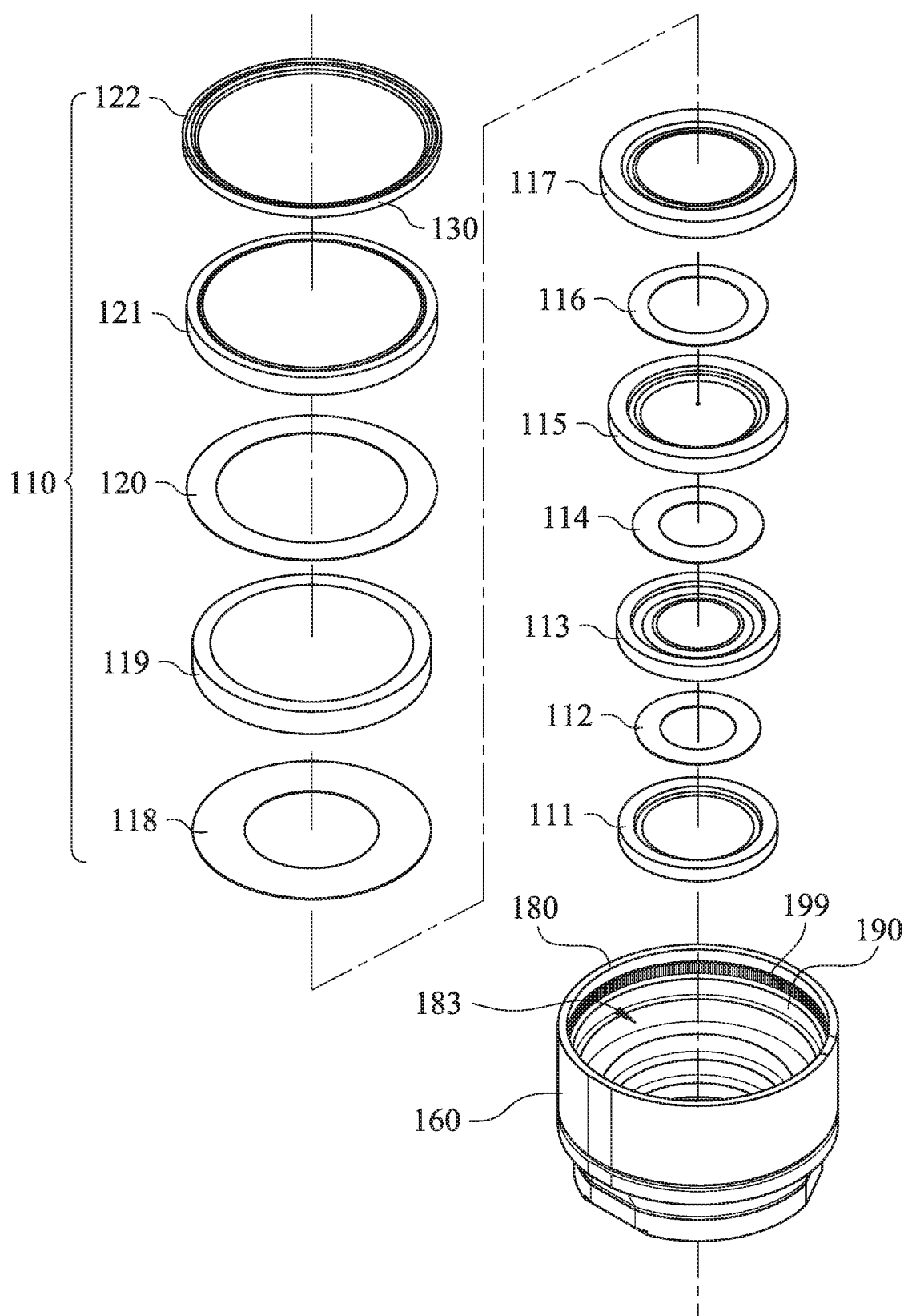

FIG. 1C is a 3-D view of the imaging lens module 100 according to the 1st embodiment, and FIG. 1D is an exploded view of the plastic barrel 160 and the optical lens assembly 110 according to the 1st embodiment. In FIG. 1A to FIG. 1D, the optical lens assembly 110 includes a plurality of optical elements 111-122, and the optical elements 111-122 are disposed in the plastic barrel 160 and arranged along an optical axis of the imaging lens module 100. In the 1st embodiment, the optical lens assembly 110 includes, from an object side to an image side, the optical elements 111, 112, 113, 114, 115, 116, 117, 118, 119, 120, 121, and 122, and the optical elements 111-122 are disposed in the plastic barrel 160 and arranged along an optical axis, wherein the optical elements 111, 113, 115, 117, 119, and 121 are lens elements, the optical elements 112, 114, 116, 118, and 120 are light blocking sheets, and the optical element 122 is a spacer.

Figure 1E:
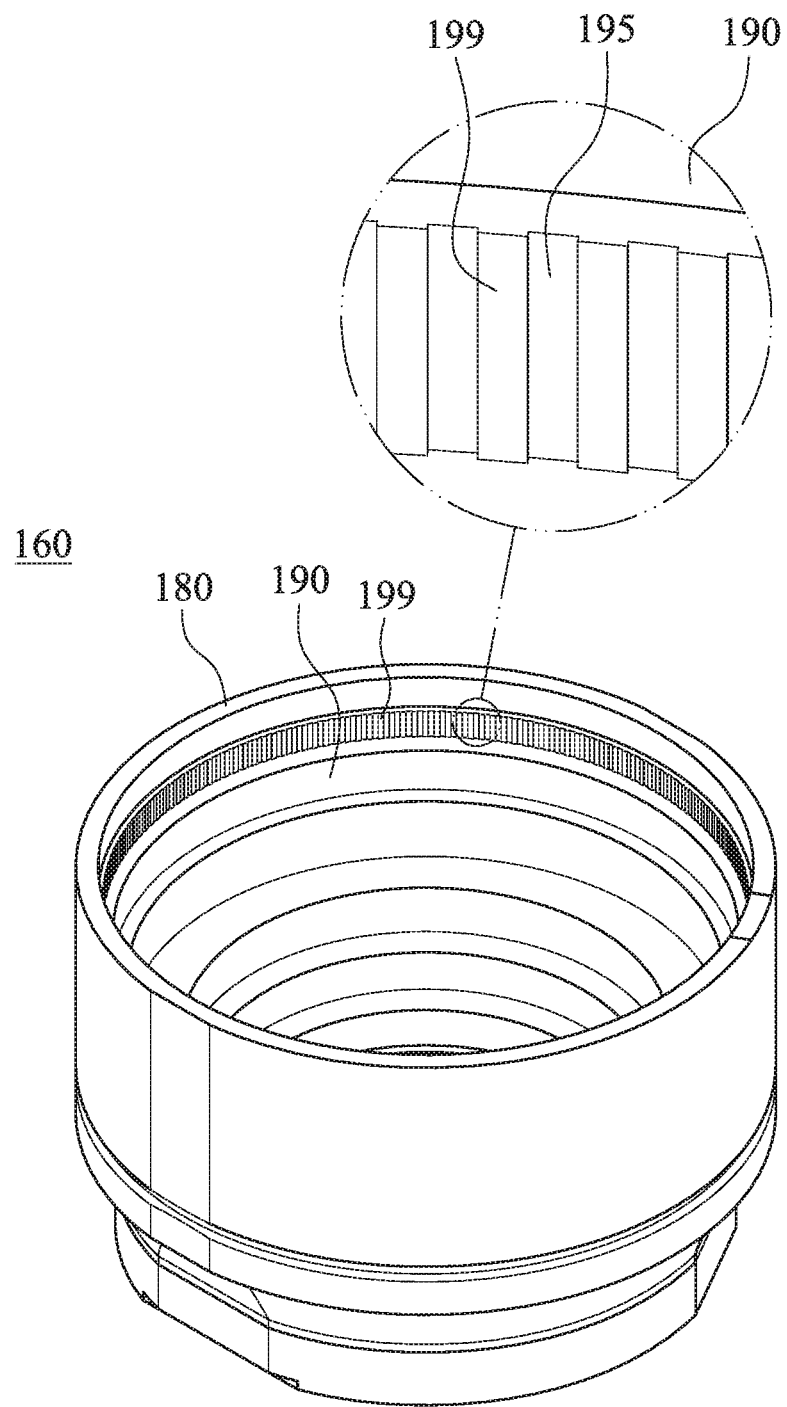
Figure 1F:
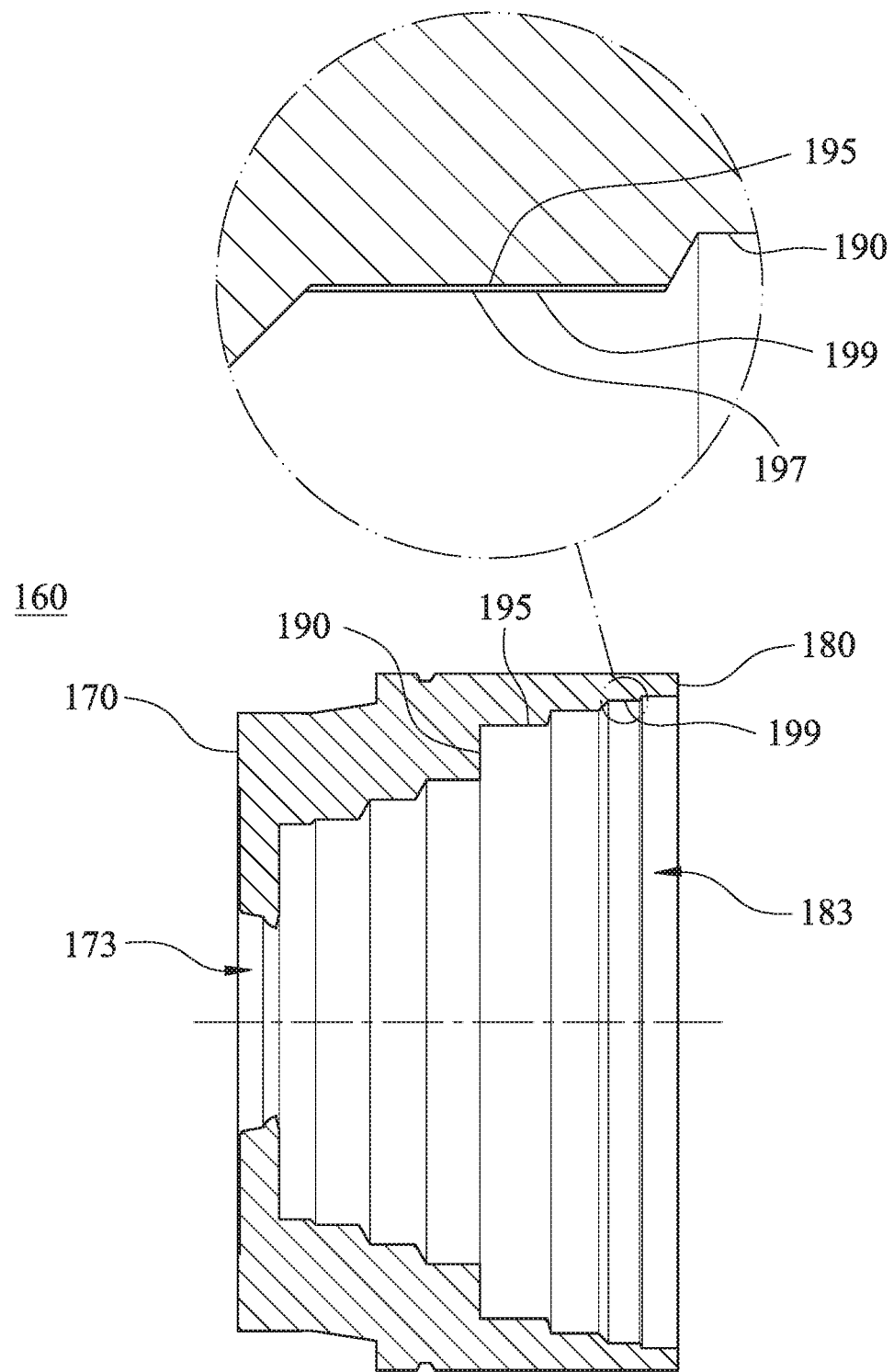

FIG. 1E illustrates a 3-D view of the plastic barrel 160 according to the 1st embodiment, and FIG. 1F illustrates a schematic view of the plastic barrel 160 according to the 1st embodiment. In FIG. 1E and FIG. 1F, the plastic barrel 160 includes an outer object-end surface 170, an outer image-end surface 180, and an inner tube surface 190. The outer object-end surface 170 is a surface of the plastic barrel 160 facing an imaged object (not shown), and the outer object-end surface 170 surrounds an object-end opening 173. The outer image-end surface 180 is a surface of the plastic barrel 160 facing an image surface, and the outer image-end surface 180 surrounds an image-end opening 183.

Figure 1G:
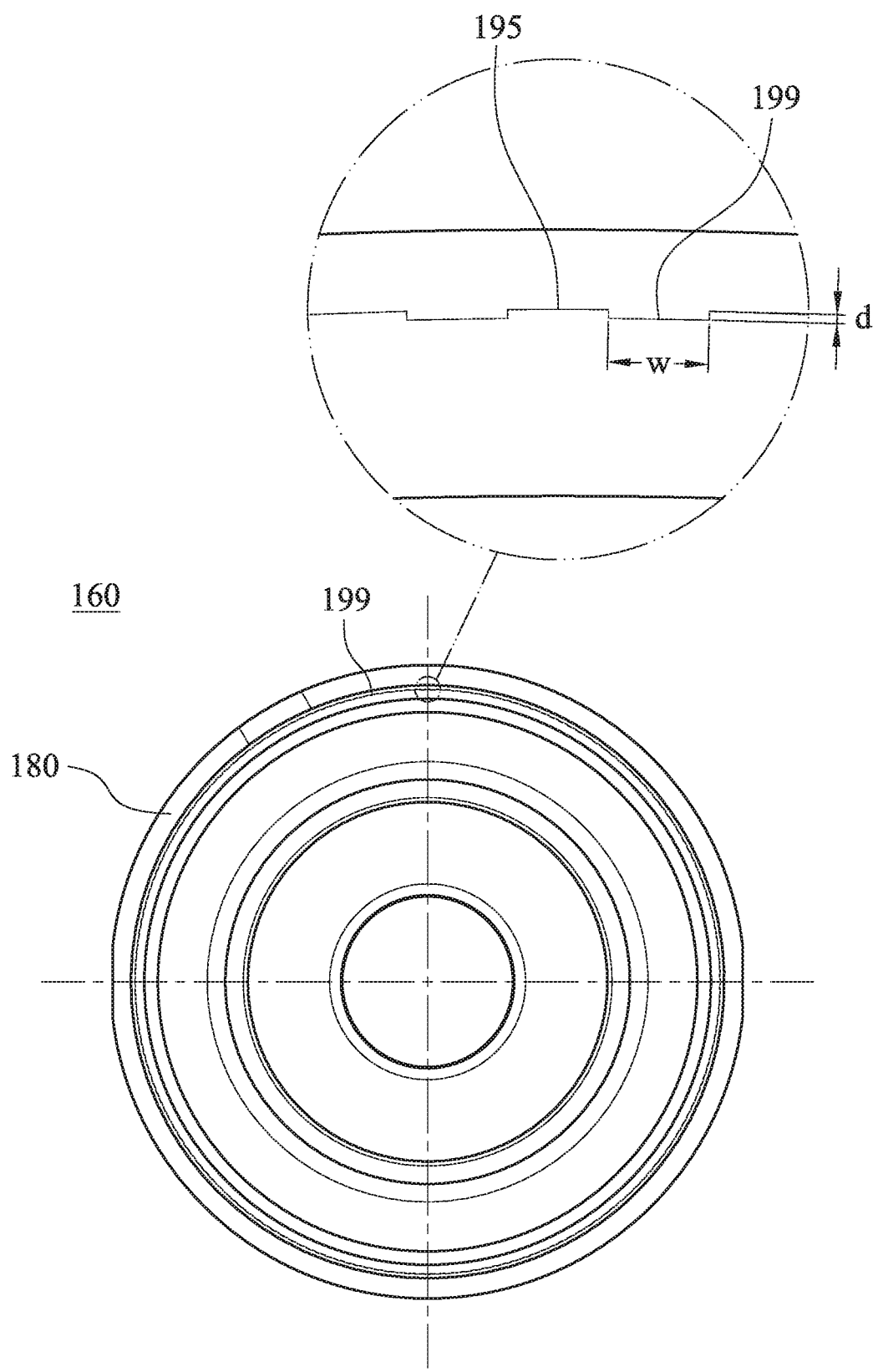

FIG. 1G illustrates a plane view of the plastic barrel 160 according to the 1st embodiment. In FIG. 1E to FIG. 1G, the inner tube surface 190 connects the outer object-end surface 170 and the outer image-end surface 180, and faces the optical axis of the imaging lens module 100. The inner tube surface 190 includes a plurality of parallel inner surfaces 195, and vertical distances between all locations of each of the parallel inner surfaces 195 and the optical axis are the same. A plurality of stripe structures 199 are disposed on and protruded from at least one of the parallel inner surfaces 195, and the stripe structures 199 are regularly arranged along a circumferential direction of the parallel inner surfaces 195.

According to the 1st embodiment in FIG. 1G, each of the stripe structures 199 protrudes from the parallel inner surfaces 195 in an angle nearly vertical. Depending on the molding and release properties of the stripe structures 199, each of the stripe structures 199 can protrude from the parallel inner surfaces 195 in a round angle, or the parallel inner surfaces 195 between the adjacent stripe structures 199 have an arc feature being slightly recessed. Alternatively, a cross-section of each of the stripe structures 199 appears to be a trapezoid with a wide bottom and a narrow top, but the disclosure is not limited thereto.

Figure 1H:
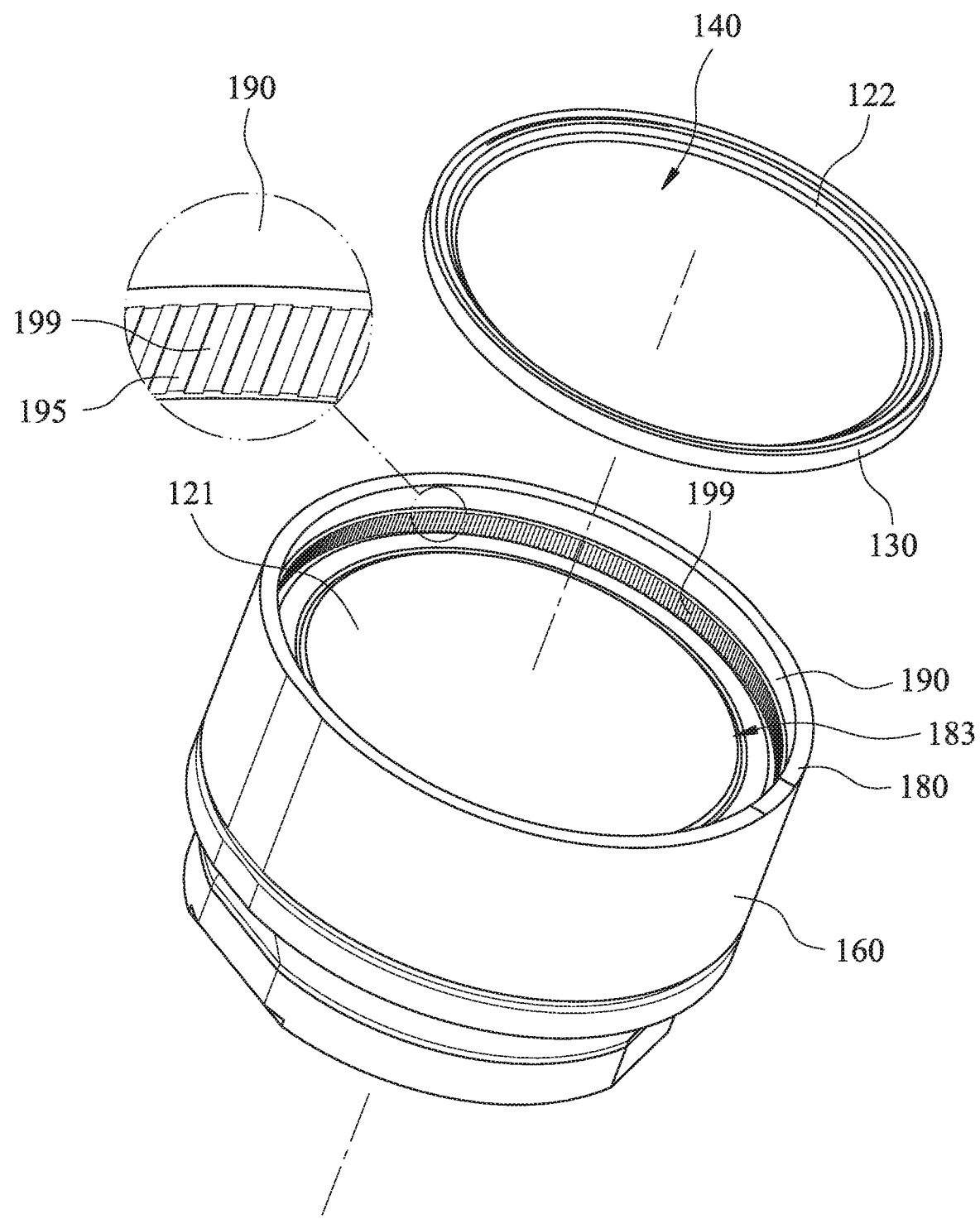

FIG. 1H is a schematic view of the stripe structures 199 and the optical element 122 according to the 1st embodiment. In FIG. 1B, FIG. 1O, and FIG. 1H, the outer annular surface 130 of the optical element 122 is disposed correspondingly to the stripe structures 199, or it can also be said that the stripe structures 199 are disposed correspondingly to the outer annular surface 130. The glue material 150 is applied between the outer annular surface 130 and the stripe structures 199, or it can also be said that the glue material 150 is applied among the outer annular surface 130, the stripe structures 199 and the aforementioned parallel inner surfaces 195, wherein the glue material 150 is an adhesive whose material is not limited. Accordingly, the application range control of the glue material 150 and the uniform application of the glue material 150 can be facilitated, and the demands of mass productions of the imaging lens module 100 can be satisfied. In addition, the appearance of the imaging lens module 100 can be prevented from being affected by the bumps caused by the partially overflowed glue material 150. In other embodiments (not shown), a plurality of stripe structures can be disposed on and protruded from two or more parallel inner surfaces of the inner tube surface, and the stripe structures are regularly arranged along a circumferential direction of the parallel inner surfaces. Outer annular surfaces of two or more optical elements are disposed correspondingly to the stripe structures on the parallel inner surfaces, and the glue materials are respectively applied between the outer annular surface and the corresponding stripe structure.

Figure 1I:
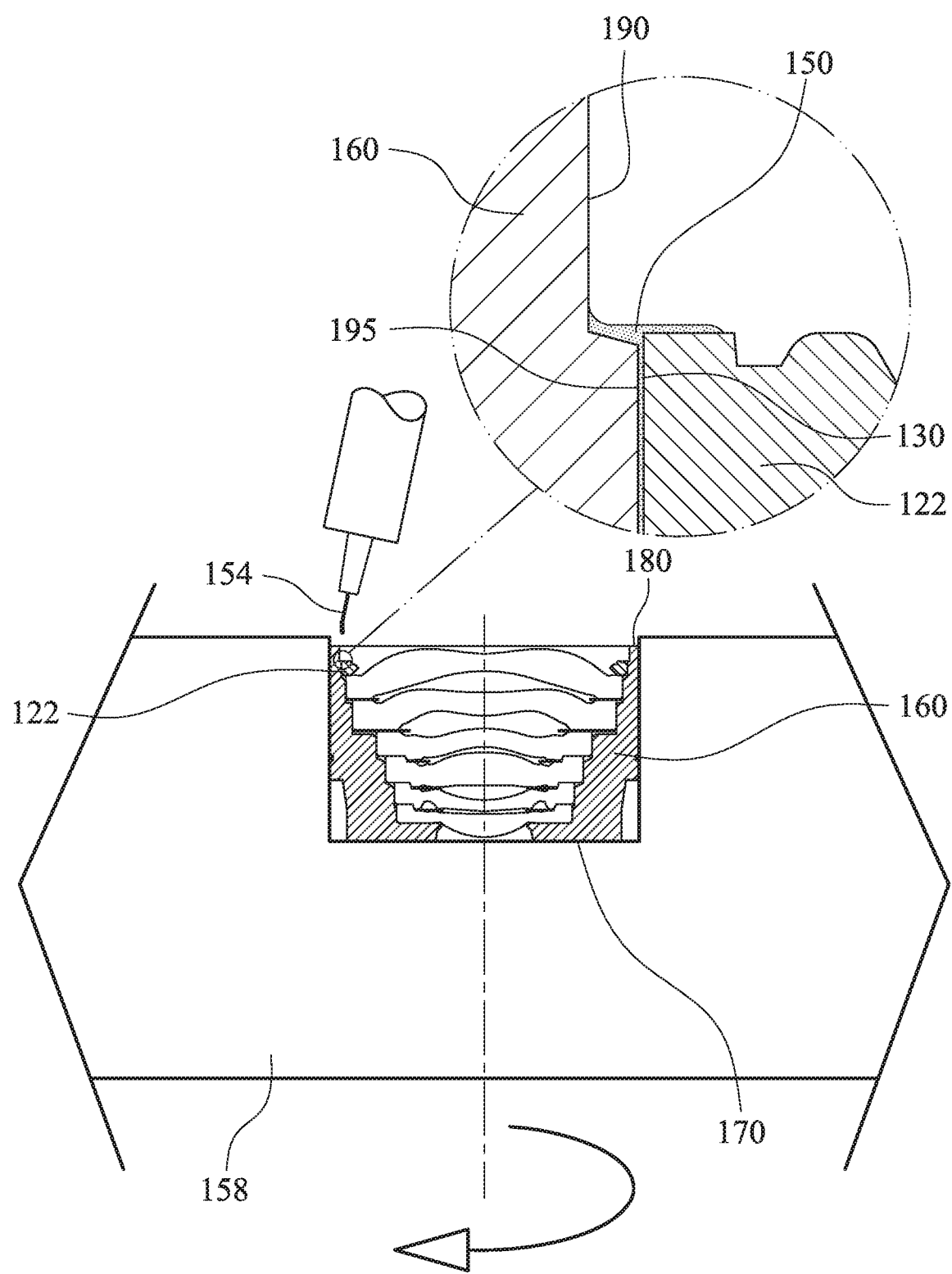
Figure 1J:
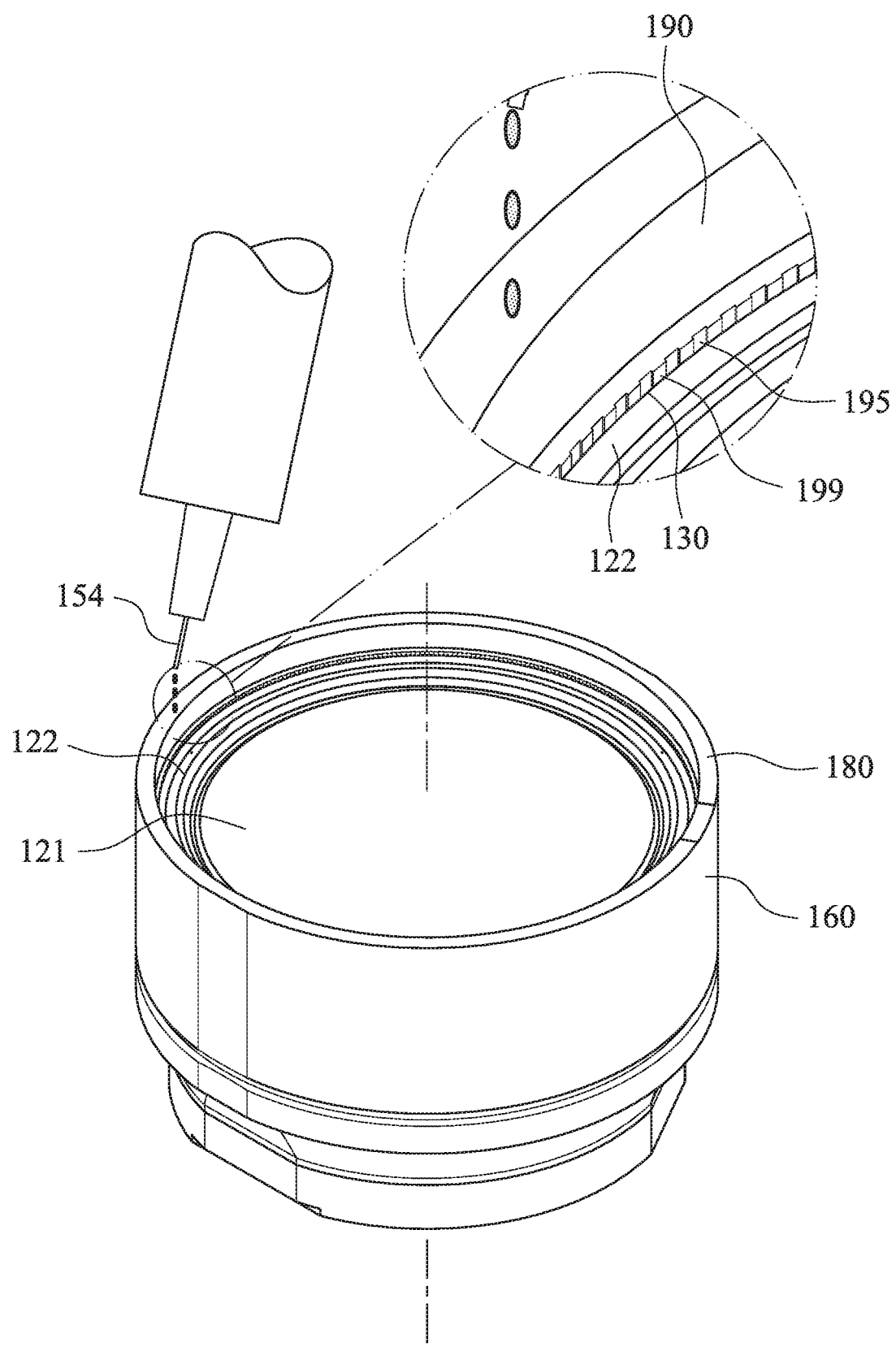

In detail, FIG. 1I is a schematic view of applying the glue material 150 according to the 1st embodiment, and FIG. 1J is another schematic view of applying the glue material 150 according to the 1st embodiment. In FIG. 1I and FIG. 1J, the outer annular surface 130 of the optical element 122 is disposed correspondingly to the stripe structures 199, and there is a gap between the outer annular surface 130 and each of the stripe structures 199. In the 1st embodiment, a needle 154 is used to apply the glue material 150, wherein an assembly platform 158 is used to assist to place the optical elements 111-122 into the plastic barrel 160, and the plastic barrel 160 is placed on the assembly platform 158 while the outer image-end surface 180 faces an upward direction.

The assembly platform 158 can be a fixed fixture for a single imaging lens module or an array of fixing plates for a plurality of imaging lens modules for fixing the imaging lens module 100. The needle 154 is placed above the gap between the outer annular surface 130 and the stripe structures 199, and there is a degree of freedom between the assembly platform 158 and the needle 154 to control the application location of the glue material 150 via relative movements or relative rotations to apply the glue material 150 between the outer annular surface 130 and the stripe structures 199.

When the needle 154 is used to apply the glue material 150 being in a flow state to the gap between the outer annular surface 130 and each of the stripe structures 199, the glue material 150 will downwardly spread to the gap between the outer annular surface 130 and each of the stripe structures 199. Meanwhile, the glue material 150 will spread to the inner tube surface 190 and the surface of the optical element 122 facing the needle 154 to fix the optical elements 111-122 in the plastic barrel 160. Furthermore, according to the imaging lens module 100 of the present disclosure, by applying the glue material 150 between the outer annular surface 130 and the stripe structures 199, the glue material 150 can be prevented from partially overflowing to cause bumps or sparkling traces of a large area of the glue material 150 on the inner tube surface 190 and the surface of the optical element 122 facing the needle 154 to affect the appearance of the imaging lens module 100.

In the 1st embodiment, the application location of the glue material 150 is controlled via the rotations of the assembly platform 158 relative to the needle 154. In other embodiments (not shown), the application location of the glue material 150 can be controlled via the rotations of the needle 154 relative to the assembly platform 158 or the relative movements between the assembly platform 158 and the needle 154, but the present disclosure is not limited thereto. Moreover, the glue material 150 is not limited to be applied by the needle 154.

In FIG. 1E to FIG. 1G, the stripe structures 199 and the plastic barrel 160 can be formed integrally. Accordingly, the plastic barrel 160 can be applicable for mass productions.

A length direction of each of the stripe structures 199 can be parallel to the optical axis of the imaging lens module 100. Accordingly, the plastic barrel 160 can be manufactured by an injection molding method more easily. In the 1st embodiment, a length direction of each of the stripe structures 199 is parallel to the optical axis of the imaging lens module 100. In other embodiments (not shown), the length direction of each of the stripe structures is not parallel to the optical axis of the imaging lens module, i.e., the length direction of each of the stripe structures can rotate relatively to the optical axis along the parallel inner surfaces thereof, and the stripe structures are regularly arranged along a circumferential direction of the parallel inner surfaces.

Each of the stripe structures 199 includes a light diminishing surface 197, wherein when a surface roughness of the light diminishing surface 197 is Ra, the following condition can be satisfied: $0.1\ \mu m<Ra<4.0\ \mu m$. Accordingly, the application of the glue material 150 can be facilitated to prevent the dispensing quality from being affected by the variation of the glue volume of the glue material 150. Furthermore, each of the light diminishing surfaces 197 can be disposed on all or part of surfaces of each of the stripe structures 199. When the needle 154 is used to apply the glue material 150 being in the flow state to the gap between the outer annular surface 130 and each of the stripe structures 199, it is difficult for the glue material 150 to continuously spread over the light diminishing surface 197 of the stripe structure 199, and hence the application range of the glue material 150 can be controlled while preventing the glue material 150 from overflowing to other unnecessary places of the imaging lens module 100.

In FIG. 1B, the outer annular surface 130 of the optical element 122 disposed correspondingly to the stripe structures 199 can contact with at least one of the stripe structures 199. Accordingly, the efficiency of applying the glue material 150 can be improved, and the uniform application of the glue material 150 can be facilitated. In the 1st embodiment, the outer annular surface 130 can contact with part of the stripe structures 199, i.e., the outer annular surface 130 can be against part of the stripe structures 199. The outer annular surface 130 can also contact with all of the stripe structures 199, i.e., the outer annular surface 130 can be against all of the stripe structures 199.

In FIG. 1E and FIG. 1F, the stripe structures 199 can be disposed merely on one parallel inner surface 195. Accordingly, the automation equipment for applying the glue material 150 will be facilitated to identify the location of the stripe structure 199 easily.

The number of the stripe structures 199 on the aforementioned parallel inner surface 195 can range between 80 and 300. Accordingly, the stripe structures 199 being densely arranged facilitate the uniform application of the glue material 150.

In FIG. 1G, when a protruded height of any one of the stripe structures 199 is d, the following condition can be satisfied: $2\ \mu m<d<30\ \mu m$. Accordingly, the stripe structures 199 have proper depths, and the mass productions and the dispensing quality can be balanced. Preferably, the following condition can be satisfied: $2\ \mu m<d<15\ \mu m$. In the 1st embodiment, the value of the parameter d of all of the stripe structures 199 can be the same or similar.

When a protruded height of any one of the stripe structures 199 is d, and a width of the any one of the stripe structures 199 is w, the following condition can be satisfied: $0<d/w<0.50$. Accordingly, the stripe structures 199 being properly and densely arranged facilitate to reduce the manufacturing difficulty of the plastic barrel 160. Preferably, the following condition can be satisfied: $0<d/w<0.35$. In the 1st embodiment, the value of the parameter d of all of the stripe structures 199 can be the same or similar, the value of the parameter w can be the same or similar as well, and the spacing between any two of the adjacent stripe structures 199 can be the same or similar. Further, according to the imaging lens module of the present disclosure, the way of the stripe structures being regularly arranged along the circumferential direction of the parallel inner surface is not limited by the value of the parameter d, the value of the parameter w, and the spacing being the same or similar, but the stripe structures can be arranged periodically as well.

In FIG. 1F, the number of the parallel inner surfaces 195 of the inner tube surface 190 can be at least 6. Accordingly, the plastic barrel 160 can be facilitated to contain more optical elements to promote the optical quality of the imaging lens module 100. In the 1st embodiment, the number of the parallel inner surfaces 195 of the inner tube surface 190 is 8.

The location of a maximum outer diameter of the plastic barrel 160 can be near the outer image-end surface 180, and the maximum outer diameter of the plastic barrel 160 can be greater than a distance parallel to the optical axis between the outer object-end surface 170 and the outer image-end surface 180. Accordingly, the mechanical design of the imaging lens module 100 can be applicable to the specification of high modulation transfer function (MTF). In the 1st embodiment, the location of the maximum outer diameter of the plastic barrel 160 is near the outer image-end surface 170, the maximum outer diameter of the plastic barrel 160 is 14.1 mm, and the distance parallel to the optical axis between the outer object-end surface 170 and the outer image-end surface 180 is 8.9 mm, and hence the maximum outer diameter of the plastic barrel 160 is greater than the distance parallel to the optical axis between the outer object-end surface 170 and the outer image-end surface 180.

In FIG. 1A, the object-end opening 173 of the plastic barrel 160 can be an aperture stop of the optical lens assembly 110. Accordingly, the complexity of the mechanical design of the imaging lens module 100 can be facilitated to be reduced. In the 1st embodiment, object-end opening 173 of the plastic barrel 160 is the aperture stop of the optical lens assembly 110.

In FIG. 1A and FIG. 1G, the optical element 122 being disposed correspondingly to the stripe structures 199 is a spacer. The optical element 122 includes a hole 140, and the optical axis of the imaging lens module 100 passes through the hole 140.

The outer image-end surface 180 is closer to the optical element 122 being disposed correspondingly to the stripe structure 199 than the outer object-end surface 170 is to the optical element 122 being disposed correspondingly to the stripe structure 199. Accordingly, it is applicable to the mechanical configuration of the lens with short back focal length (e.g., the imaging lens module 100).

Please also see the following Table 1, which lists the data defined based on the aforementioned parameters of the imaging lens module 100 of the 1st embodiment as illustrated in FIG. 1G.

TABLE 1

| 1st embodiment | | | |
|---|---|---|---|
| Ra (μm) | 0.56~0.8 | w (μm) | 56.76 |
| d (μm) | 5.0 | d/w | 0.088 |

2nd Embodiment

Figure 2A:
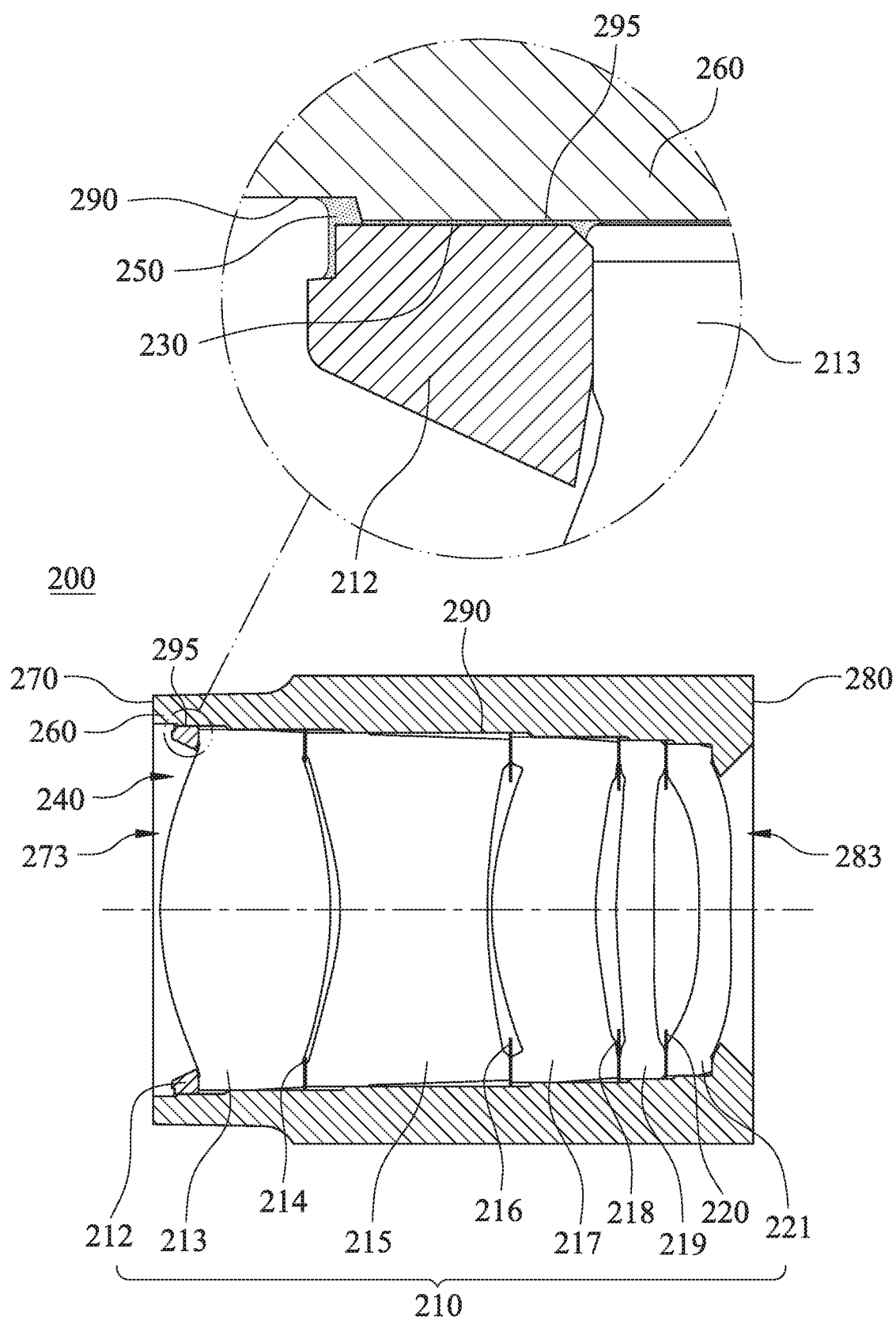
FIG. 2A is a schematic view of an imaging lens module according to the 2nd embodiment of the present disclosure.

FIG. 2A is a schematic view of an imaging lens module 200 according to the 2nd embodiment of the present disclosure. In FIG. 2A, the imaging lens module 200 includes an optical lens assembly 210, a plastic barrel 260, and a glue material 250. The imaging lens module 200 can further include a filter (not shown) and an image surface (not shown).

The optical lens assembly 210 includes a plurality of optical elements 212-221, and the optical elements 212-221 are disposed in the plastic barrel 260 and arranged along an optical axis of the imaging lens module 200. In the 2nd embodiment, the optical lens assembly 210 includes, from an object side to an image side, the optical elements 212, 213, 214, 215, 216, 217, 218, 219, 220, and 221, and the optical elements 212-221 are disposed in the plastic barrel 260 and arranged along an optical axis, wherein the optical elements 213, 215, 217, 219 and 221 are lens elements, the optical elements 214, 216, 218, and 220 are light blocking sheets, and the optical element 212 is a spacer.

Figure 2B:
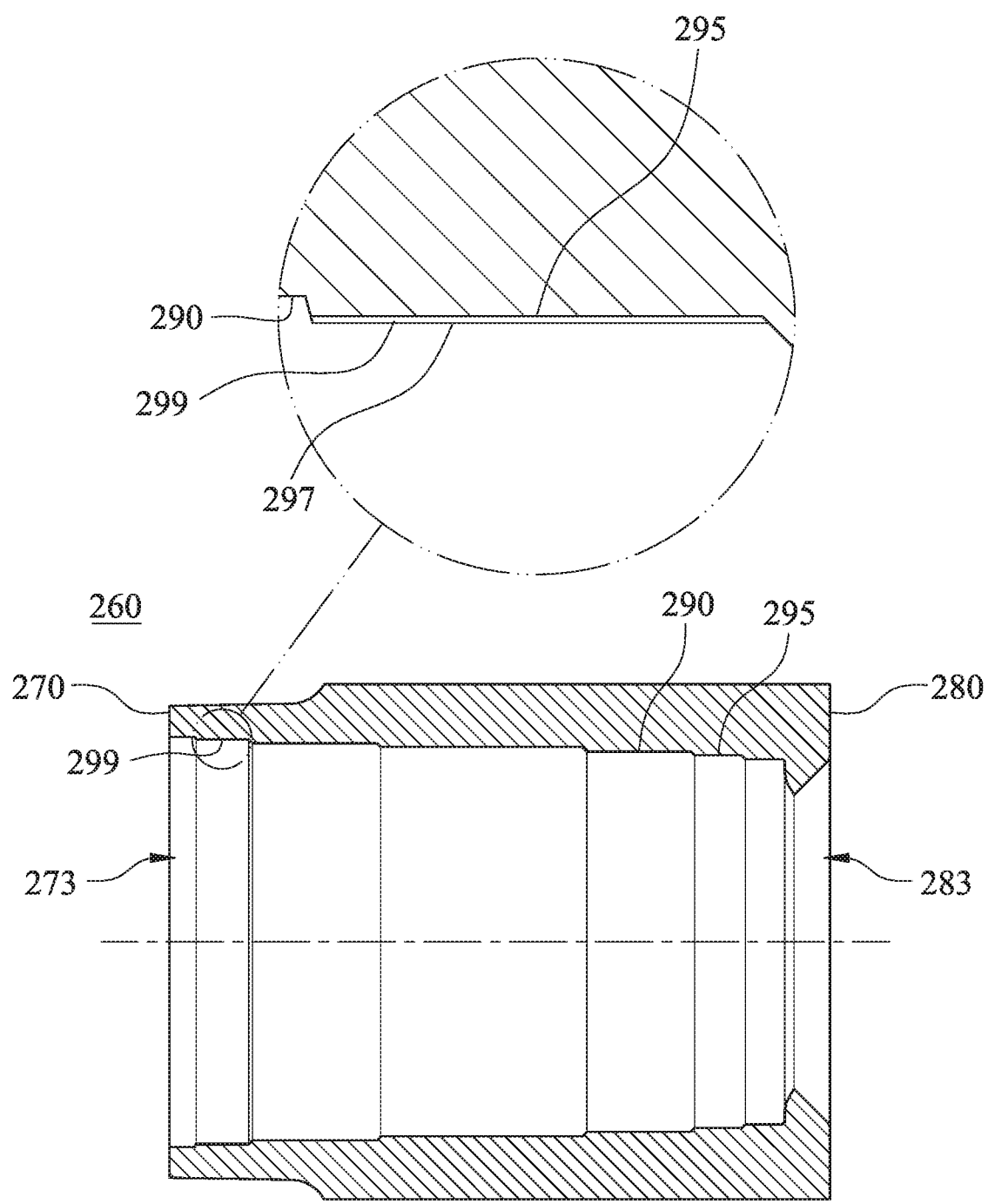
FIG. 2B is a schematic view of the plastic barrel according to the 2nd embodiment.
Figure 2C:
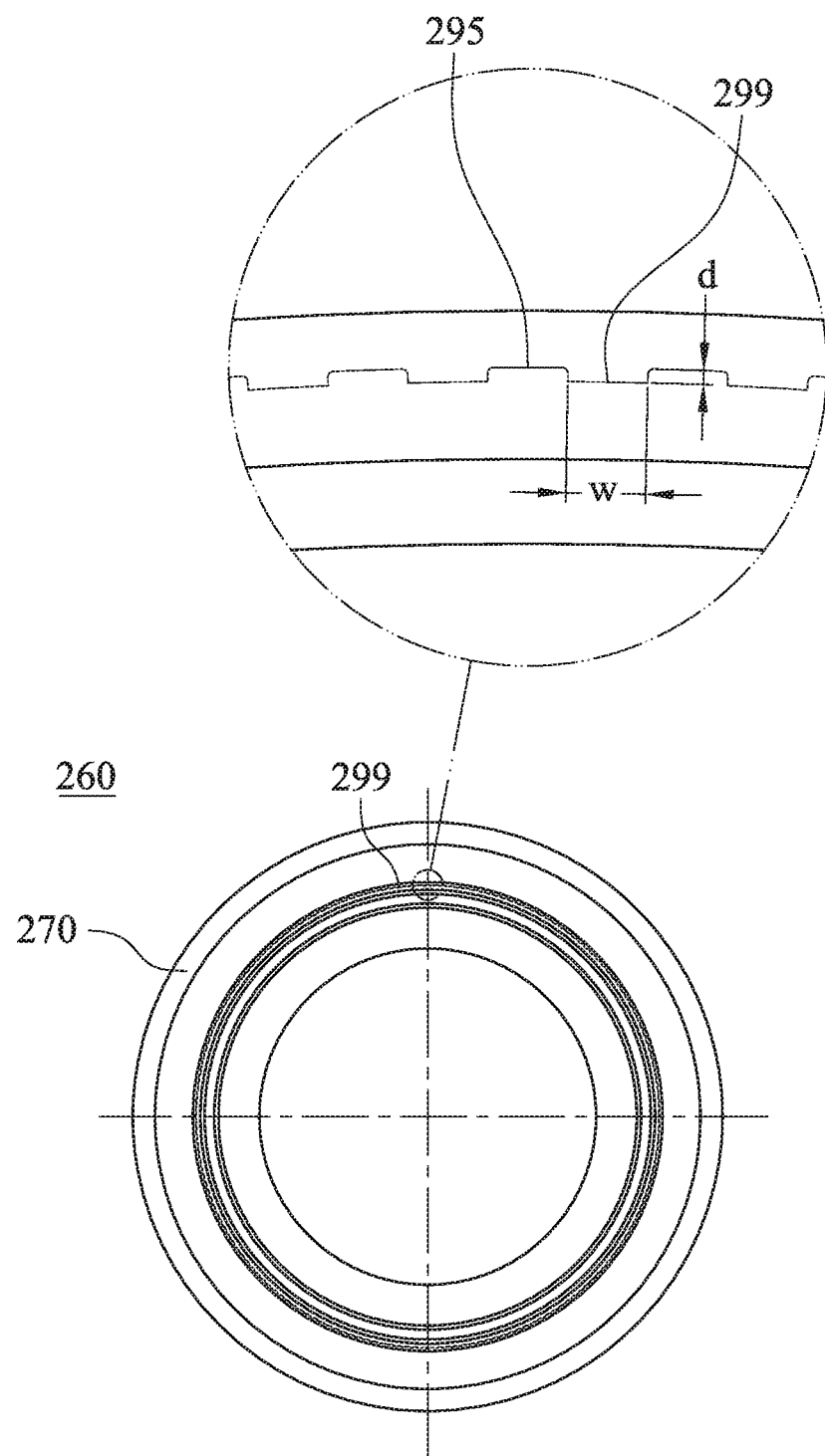
FIG. 2C is a plane view of the plastic barrel according to the 2nd embodiment.

FIG. 2B is a schematic view of the plastic barrel 260 according to the 2nd embodiment, and FIG. 2C is a plane view of the plastic barrel 260 according to the 2nd embodiment. In FIG. 2A to FIG. 2C, the plastic barrel 260 includes an outer object-end surface 270, an outer image-end surface 280, and an inner tube surface 290. The outer object-end surface 270 is a surface of the plastic barrel 260 facing an imaged object (not shown), and the outer object-end surface 270 surrounds an object-end opening 273. The outer image-end surface 280 is a surface of the plastic barrel 260 facing an image surface, and the outer image-end surface 280 surrounds an image-end opening 283. The inner tube surface 290 connects the outer object-end surface 270 and the outer image-end surface 280, and faces the optical axis of the imaging lens module 200. The inner tube surface 290 includes a plurality of parallel inner surfaces 295, and vertical distances between all locations of each of the parallel inner surfaces 295 and the optical axis are the same. A plurality of stripe structures 299 are disposed on and protruded from at least one of the parallel inner surfaces 295 in a round angle, and the stripe structures 299 are regularly arranged along a circumferential direction of the parallel inner surfaces 295. The outer annular surface 230 of the optical element 212 is disposed correspondingly to the stripe structure 299. The glue material 250 is applied among the outer annular surface 230 and the stripe structures 299, or it can also be said that the glue material 250 is applied among the outer annular surface 230, the stripe structures 299 and the aforementioned parallel inner surface 295.

In detail, the stripe structures 299 and the plastic barrel 260 are formed integrally, and a length direction of each of the stripe structures 299 is parallel to the optical axis of the imaging lens module 200. Each of the stripe structures 299 includes light diminishing surfaces 297, and each of the light diminishing surfaces 297 is disposed on all surfaces of each of the stripe structures 299. The outer annular surface 230 of the optical element 212 being disposed correspondingly to the stripe structures 299 contacts with at least one of the stripe structures 299. All of the stripe structures 299 have the same value of parameter d, and so as the value of parameter w. The number of the stripe structures 299 on the aforementioned parallel inner surfaces 295 ranges between 80 and 300. Furthermore, the number of the parallel inner surfaces 295 of the inner tube surface 290 is 7.

In the 2nd embodiment, the optical element 212 disposed correspondingly to the stripe structures 299 is a spacer. The optical element 212 includes a hole 240. The optical axis of the imaging lens module 200 passes through the hole 240, and the hole 240 is an aperture stop of the optical lens assembly 210. Accordingly, it is applicable to the mechanical configuration of the lens assembly with long focal length (e.g., the imaging lens module 200).

The outer object-end surface 270 is closer to the optical element 212 disposed correspondingly to the stripe structures 299 than the outer image-end surface 280 is to the optical element 212 being disposed correspondingly to the stripe structure 299. Accordingly, it is applicable to the mechanical configuration of the lens assembly with long back focal length (e.g., the imaging lens module 200).

The following Table 2 lists the data of the parameters Ra, d, w, and d/w of the imaging lens module 200 of the 2nd embodiment, and the definition of each of the parameters is the same as those of the imaging lens module 100 of the 1st embodiment as illustrated in FIG. 2C.

TABLE 2

| 2nd embodiment | | | |
|---|---|---|---|
| Ra (µm) | 1.6~3.15 | w (µm) | 56.77 |
| d (µm) | 10.03 | d/w | 0.177 |

3rd Embodiment

Figure 3A:
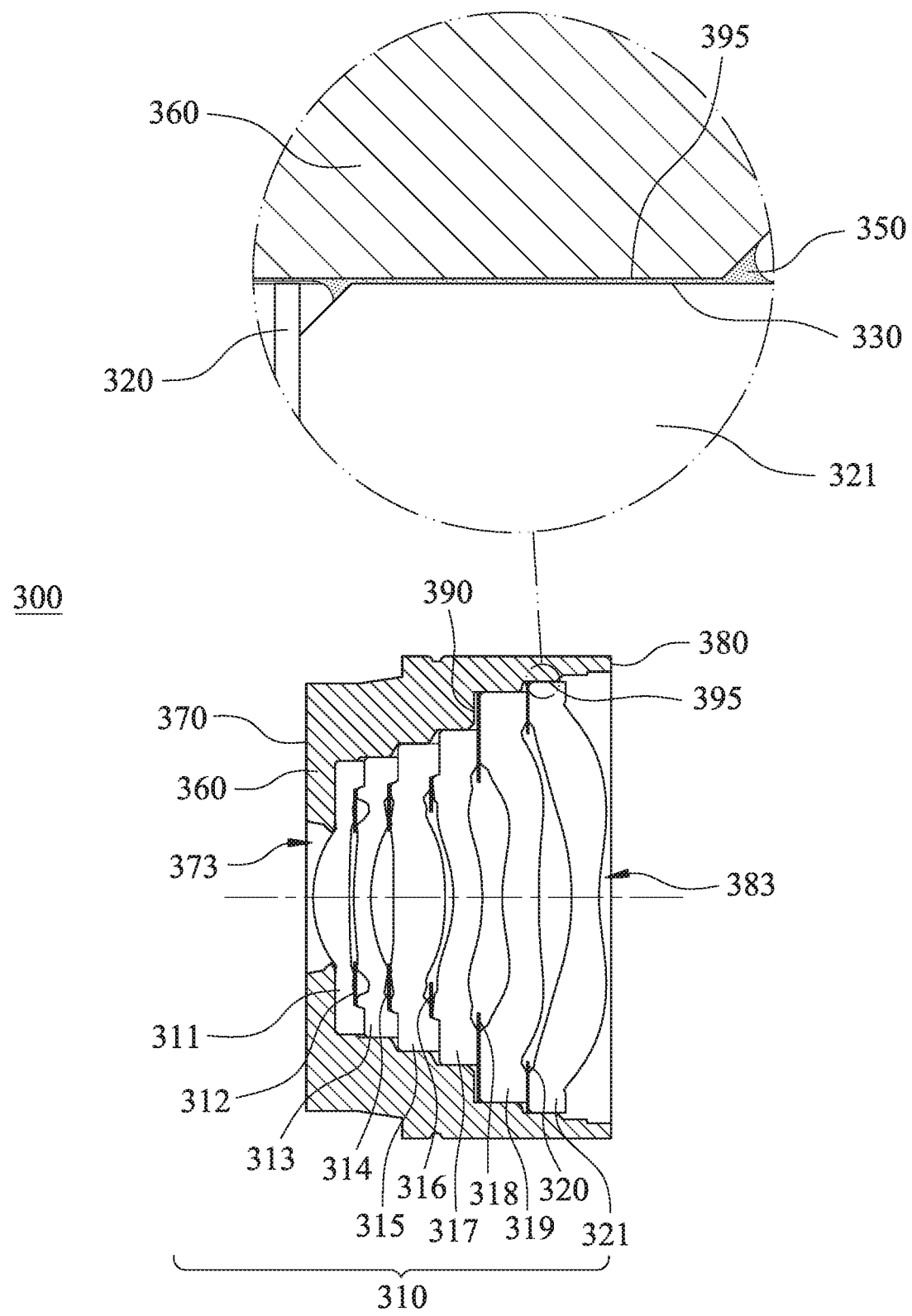
FIG. 3A is a schematic view of an imaging lens module according to the 3rd embodiment of the present disclosure.

FIG. 3A is a schematic view of an imaging lens module 300 according to the 3rd embodiment of the present disclosure. In FIG. 3A, the imaging lens module 300 includes an optical lens assembly 310, a plastic barrel 360, and a glue material 350. The imaging lens module 300 can further include a filter (not shown) and an image surface (not shown).

The optical lens assembly 310 includes a plurality of optical elements 311-321, and the optical elements 311-321 are disposed in the plastic barrel 360 and arranged along an optical axis of the imaging lens module 300. In the 3rd embodiment, the optical lens assembly 310 includes, from an object side to an image side, the optical elements 311, 312, 313, 314, 315, 316, 317, 318, 319, 320, and 321, and the optical elements 311-321 are disposed in the plastic barrel 360 and arranged along the optical axis, wherein the optical elements 311, 313, 315, 317, 319, and 321 are lens elements, and the optical elements 312, 314, 316, 318, and 320 are light blocking sheets.

Figure 3B:
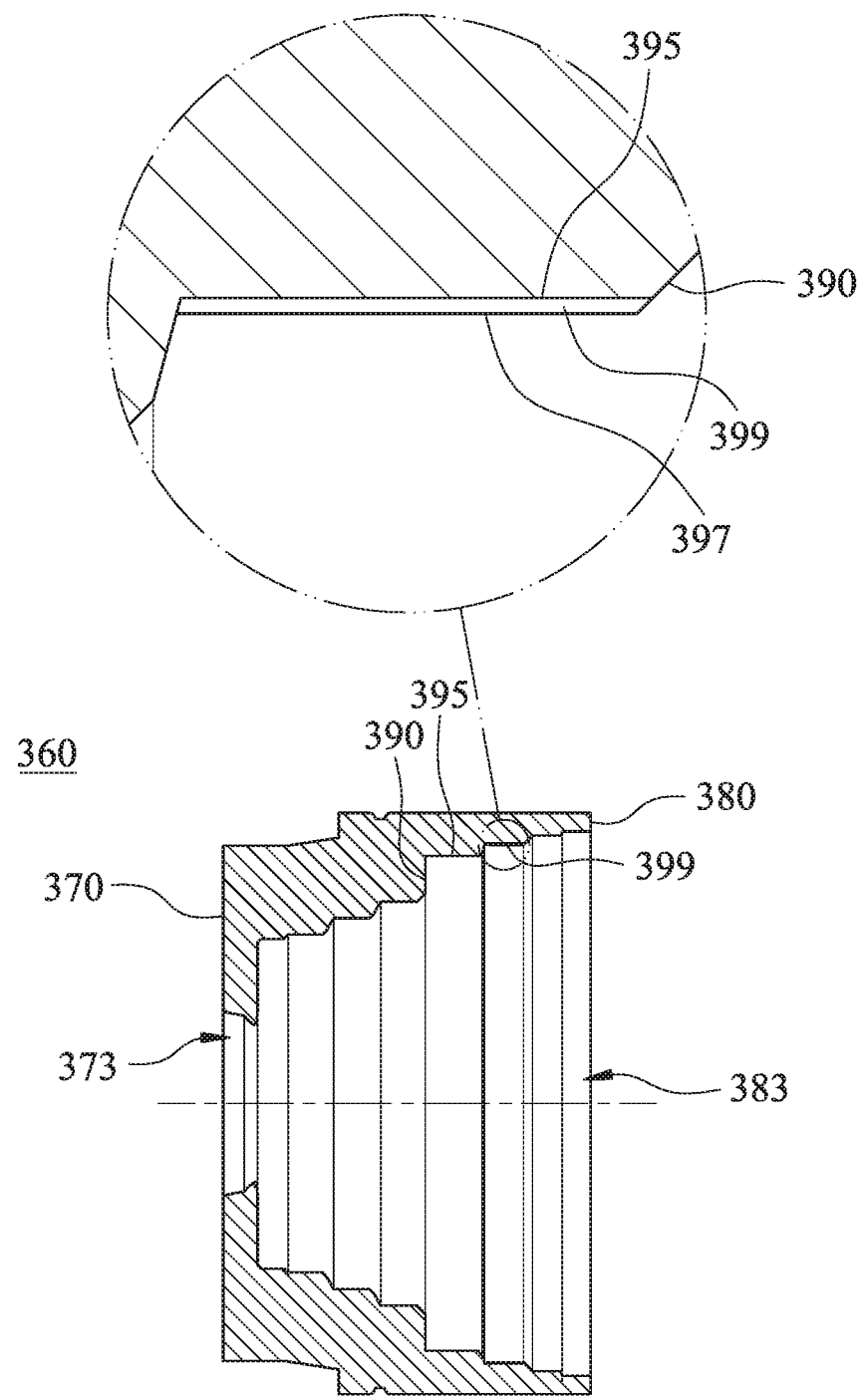
FIG. 3B is a schematic view of the plastic barrel according to the 3rd embodiment.
Figure 3C:
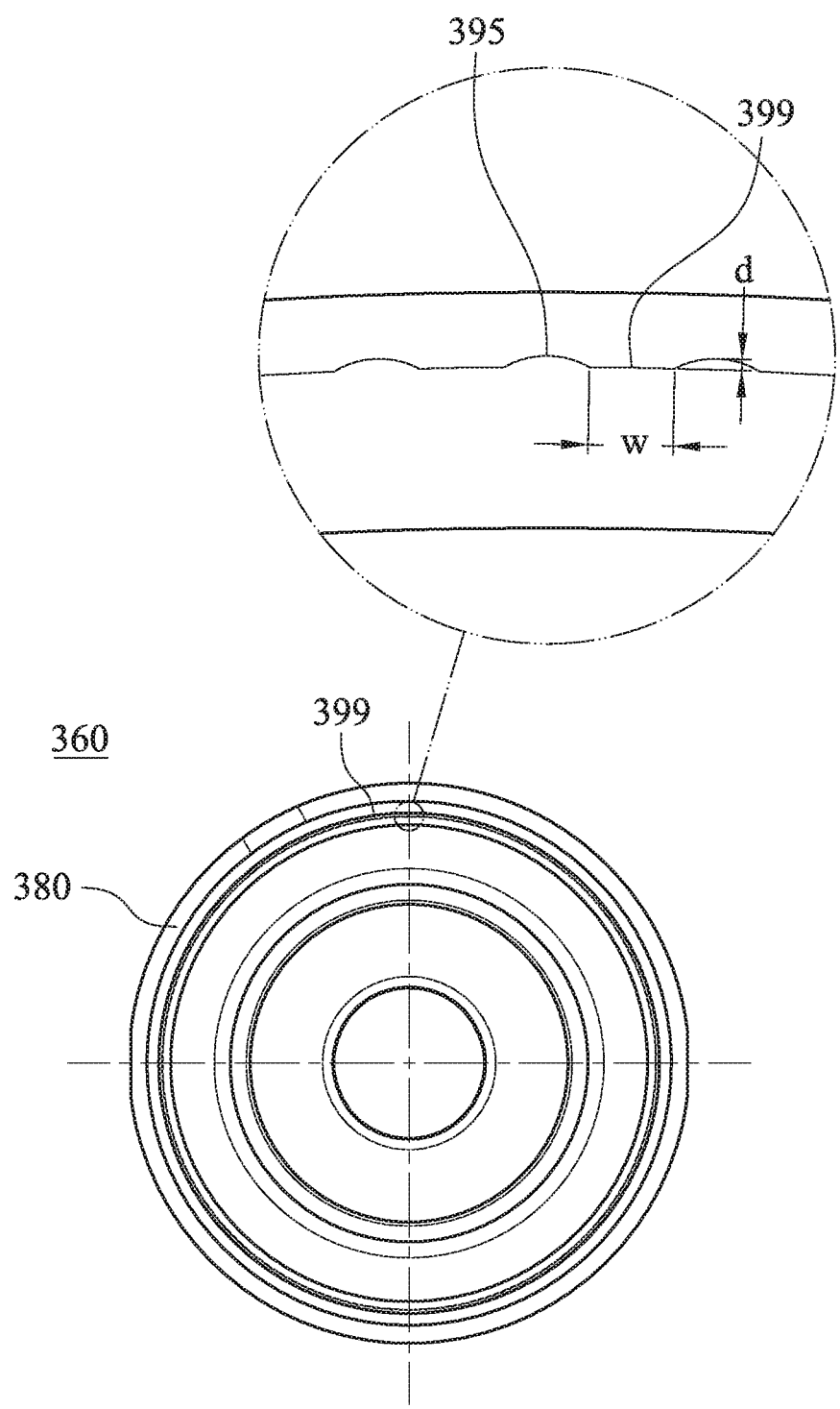
FIG. 3C is a plane view of the plastic barrel according to the 3rd embodiment.

FIG. 3B is a schematic view of the plastic barrel 360 according to the 3rd embodiment, and FIG. 3C is a plane view of the plastic barrel 360 according to the 3rd embodiment. In FIG. 3A to FIG. 3C, the plastic barrel 360 includes an outer object-end surface 370, an outer image-end surface 380, and an inner tube surface 390. The outer object-end surface 370 is a surface of the plastic barrel 360 facing an imaged object (not shown), and the outer object-end surface 370 surrounds an object-end opening 373. The outer image-end surface 380 is a surface of the plastic barrel 360 facing an image surface, and the outer image-end surface 380 surrounds an image-end opening 383. The inner tube surface 390 connects the outer object-end surface 370 and the outer image-end surface 380 and faces the optical axis of the imaging lens module 300. The inner tube surface 390 includes a plurality of parallel inner surfaces 395, and vertical distances between all locations of each of the parallel inner surfaces 395 and the optical axis are the same. A plurality of stripe structures 399 are disposed on and protruded from one of the parallel inner surfaces 395, the parallel inner surfaces 395 between the adjacent stripe structures 399 have an arc feature being slightly recessed, and the stripe structures 399 are regularly arranged along a circumferential direction of the parallel inner surfaces 395. The outer annular surface 330 of the optical element 321 is disposed correspondingly to the stripe structures 399. The glue material 350 is applied among the outer annular surface 330 and the stripe structures 399, or it can also be said that the glue material 350 is applied among the outer annular surface 330, the stripe structures 399 and the aforementioned parallel inner surfaces 395.

In detail, the stripe structures 399 and the plastic barrel 360 are formed integrally, a length direction of each of the stripe structures 399 is parallel to the optical axis of the imaging lens module 300. Each of the stripe structures 399 includes light diminishing surfaces 397, and each of the light diminishing surfaces 397 is disposed on all surfaces of each of the stripe structures 399. The outer annular surface 330 of the optical element 312 being disposed correspondingly to the stripe structures 399 contacts with at least one of the stripe structures 399. All of the stripe structures 399 have the same value of parameter d, and so as the value of parameter w. The number of the stripe structures 399 on the aforementioned parallel inner surfaces 395 ranges between 80 and 300.

Furthermore, the number of the parallel inner surfaces 395 of the inner tube surface 390 is 8. The location of a maximum outer diameter of the plastic barrel 360 is near the outer image-end surface 380, and the maximum outer diameter of the plastic barrel 360 can be greater than a distance parallel to the optical axis between the outer object-end surface 370 and the outer image-end surface 380. The object-end opening 373 of the plastic barrel 360 is an aperture stop of the optical lens assembly 310. The outer image-end surface 380 is closer to the optical element 321 being disposed correspondingly to the stripe structures 399 than the outer object-end surface 370 is to the optical element 321 being disposed correspondingly to the stripe structure 399.

In the 3rd embodiment, the optical element 321 disposed correspondingly to the stripe structures 399 is a lens element. Accordingly, the number of the optical elements in the imaging lens module 300 and the cost can be reduced effectively.

The following Table 3 lists the data of the parameters Ra, d, w, and d/w of the imaging lens module 300 of the 3rd embodiment, and the definition of each of the parameters is the same as those of the imaging lens module 100 of the 1st embodiment as illustrated in FIG. 3C.

TABLE 3

| 3rd embodiment | | | |
|---|---|---|---|
| Ra (µm) | 0.8~2.24 | w (µm) | 52.89 |
| d (µm) | 6.94 | d/w | 0.131 |

4th Embodiment

Figure 4A:
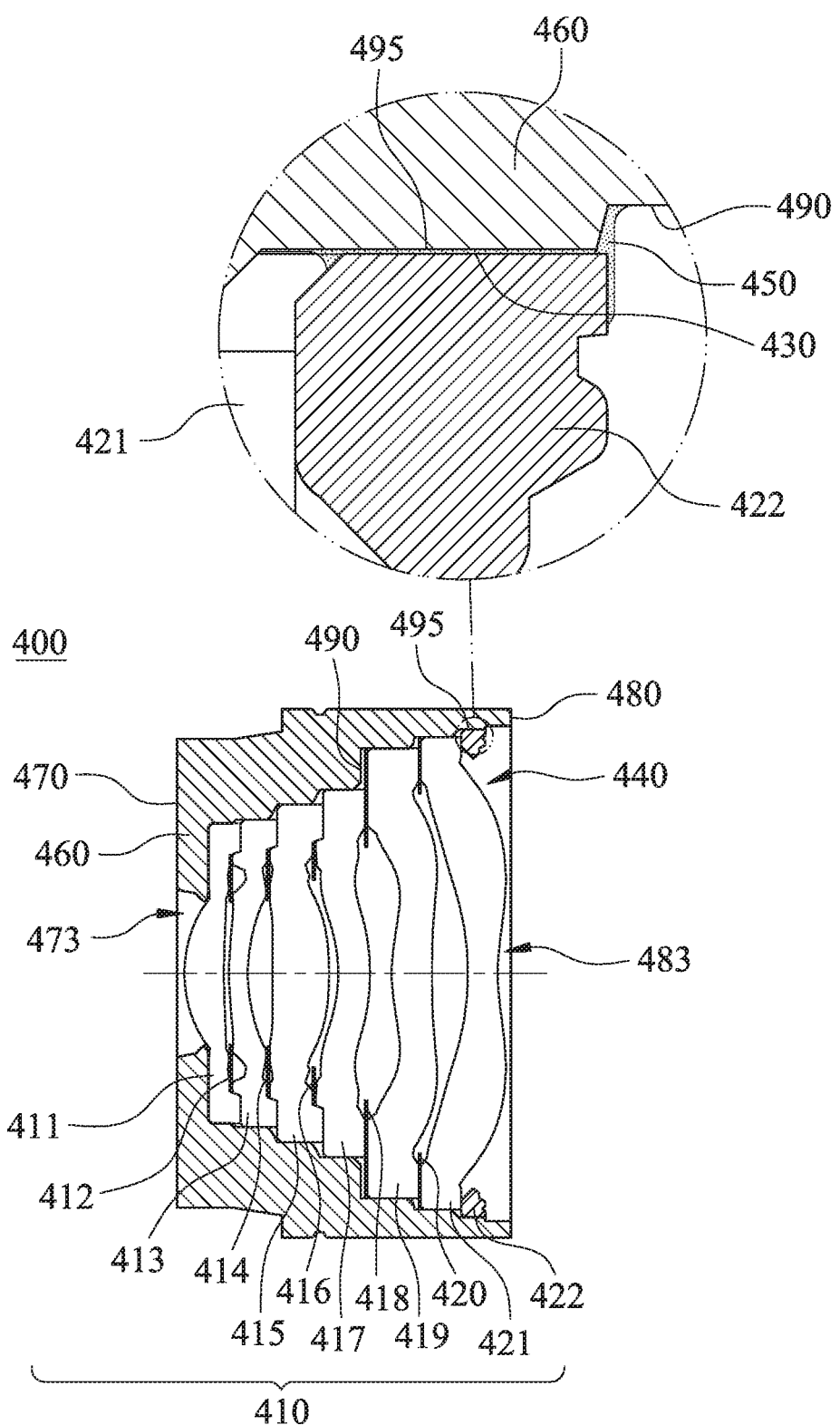
FIG. 4A is a schematic view of an imaging lens module according to the 4th embodiment of the present disclosure.

FIG. 4A is a schematic view of an imaging lens module 400 according to the 4th embodiment of the present disclosure. In FIG. 4A, the imaging lens module 400 includes an optical lens assembly 410, a plastic barrel 460, and a glue material 450. The imaging lens module 400 can further include a filter (not shown) and an image surface (not shown).

The optical lens assembly 410 includes a plurality of optical elements 411-422, and the optical elements 411-422 are disposed in the plastic barrel 460 and arranged along an optical axis of the imaging lens module 400. In the 4th embodiment, the optical lens assembly 410 includes, from an object side to an image side, the optical elements 411, 412, 413, 414, 415, 416, 417, 418, 419, 420, 421, and 422, and the optical elements 411-422 are disposed in the plastic barrel 460 and arranged along the optical axis, wherein the optical elements 411, 413, 415, 417, 419, and 421 are lens elements, the optical elements 412, 414, 416, 418, and 420 are light blocking sheets, and the optical element 422 is a spacer.

Figure 4B:
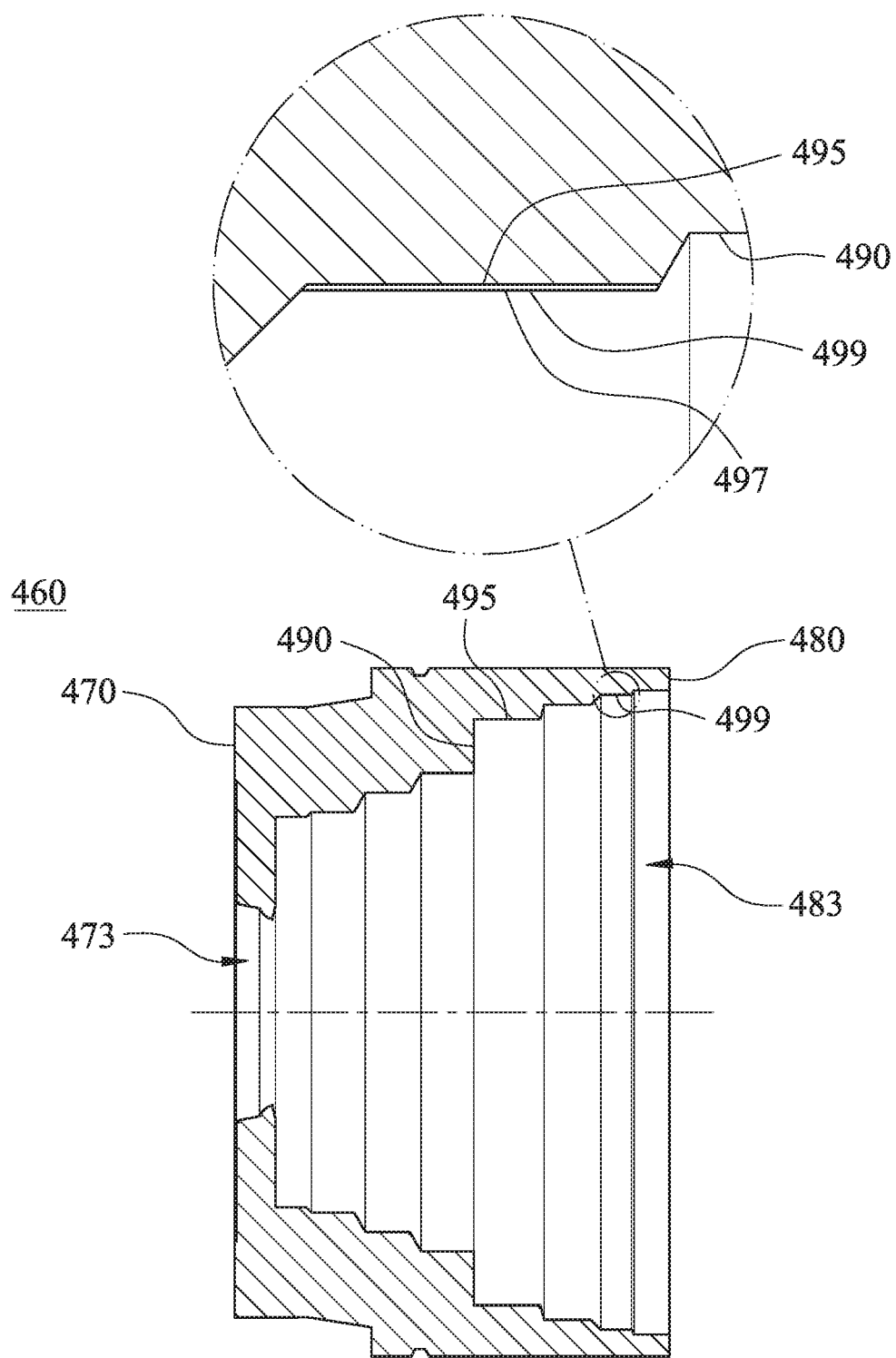
FIG. 4B is a schematic view of the plastic barrel according to the 4th embodiment.
Figure 4C:
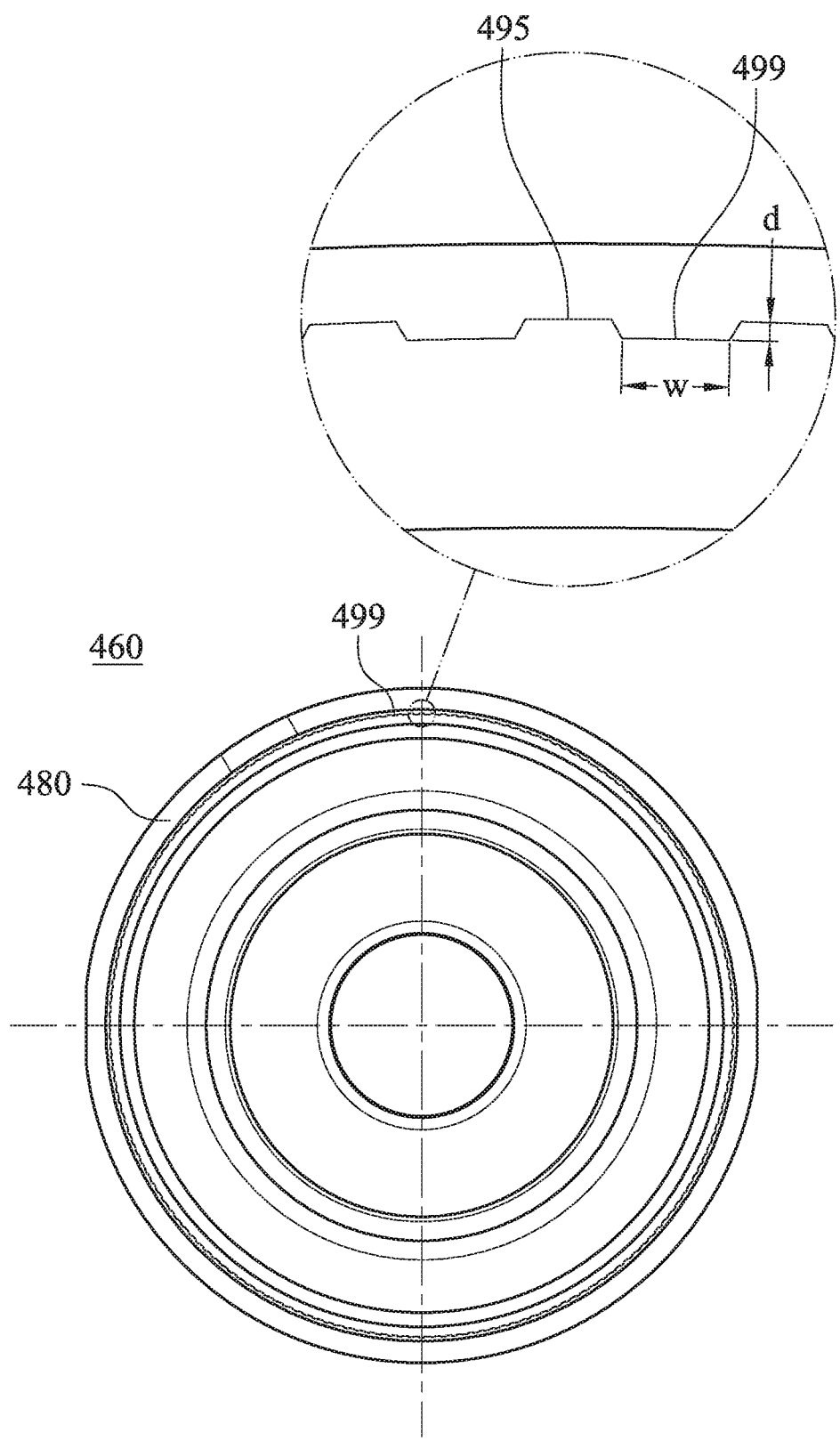
FIG. 4C is a plane view of the plastic barrel according to the 4th embodiment.

FIG. 4B is a schematic view of the plastic barrel 460 according to the 4th embodiment, and FIG. 4C is a plane view of the plastic barrel 460 according to the 4th embodiment. In FIG. 4A to FIG. 4C, the plastic barrel 460 includes an outer object-end surface 470, an outer image-end surface 480, and an inner tube surface 490. The outer object-end surface 470 is a surface of the plastic barrel 460 facing an imaged object (not shown), and the outer object-end surface 470 surrounds an object-end opening 473. The outer image-end surface 480 is a surface of the plastic barrel 460 facing an image surface, and the outer image-end surface 480 surrounds an image-end opening 483. The inner tube surface 490 connects the outer object-end surface 470, and the outer image-end surface 480 and faces the optical axis of the imaging lens module 400. The inner tube surface 490 includes a plurality of parallel inner surfaces 495, and vertical distances between all locations of each of the parallel inner surfaces 495 and the optical axis are the same. A plurality of stripe structures 499 are disposed on and protruded from one of the parallel inner surfaces 495, a cross-section of each of the stripe structures 499 appears to be a trapezoid with a wide bottom and a narrow top, and the stripe structures 499 are regularly arranged along a circumferential direction of the parallel inner surfaces 495. The outer annular surface 430 of the optical element 422 is disposed correspondingly to the stripe structures 499. The glue material 450 is applied among the outer annular surface 430 and the stripe structures 499, or it can also be said that the glue material 450 is applied among the outer annular surface 430, the stripe structures 499 and the aforementioned parallel inner surfaces 495.

In detail, the stripe structures 499 and the plastic barrel 460 are formed integrally, a length direction of each of the stripe structures 499 is parallel to the optical axis of the imaging lens module 400. Each of the stripe structures 499 includes light diminishing surfaces 497, and each of the light diminishing surfaces 497 is disposed on all surfaces of each of the stripe structures 499. The outer annular surface 430 of the optical element 412 being disposed correspondingly to the stripe structures 499 contacts with at least one of the stripe structures 499. All of the stripe structures 499 have the same value of parameter d, and so as the value of parameter w. The number of the stripe structures 499 on the aforementioned parallel inner surfaces 495 ranges between 80 and 300.

Furthermore, the number of the parallel inner surfaces 495 of the inner tube surface 490 is 8. The location of a maximum outer diameter of the plastic barrel 460 is near the outer image-end surface 480, and the maximum outer diameter of the plastic barrel 460 can be greater than a distance parallel to the optical axis between the outer object-end surface 470 and the outer image-end surface 480. The object-end opening 473 of the plastic barrel 460 is an aperture stop of the optical lens assembly 410. The outer image-end surface 480 is closer to the optical element 422 being disposed correspondingly to the stripe structures 499 than the outer object-end surface 470 is to the optical element 422 being disposed correspondingly to the stripe structures 499.

The optical element 422 disposed correspondingly to the stripe structures 499 is a spacer. The optical element 422 includes a hole 440. The optical axis of the imaging lens module 400 passes through the hole 440.

The following Table 4 lists the data of the parameters Ra, d, w, and d/w of the imaging lens module 400 of the 4th embodiment, and the definition of each of the parameters is the same as those of the imaging lens module 100 of the 1st embodiment as illustrated in FIG. 4C.

TABLE 4

| 4th embodiment | | | |
|---|---|---|---|
| Ra (μm) | 0.4~1.12 | w (μm) | 62.58 |
| d (μm) | 10.03 | d/w | 0.160 |

5th Embodiment

Figure 5A:
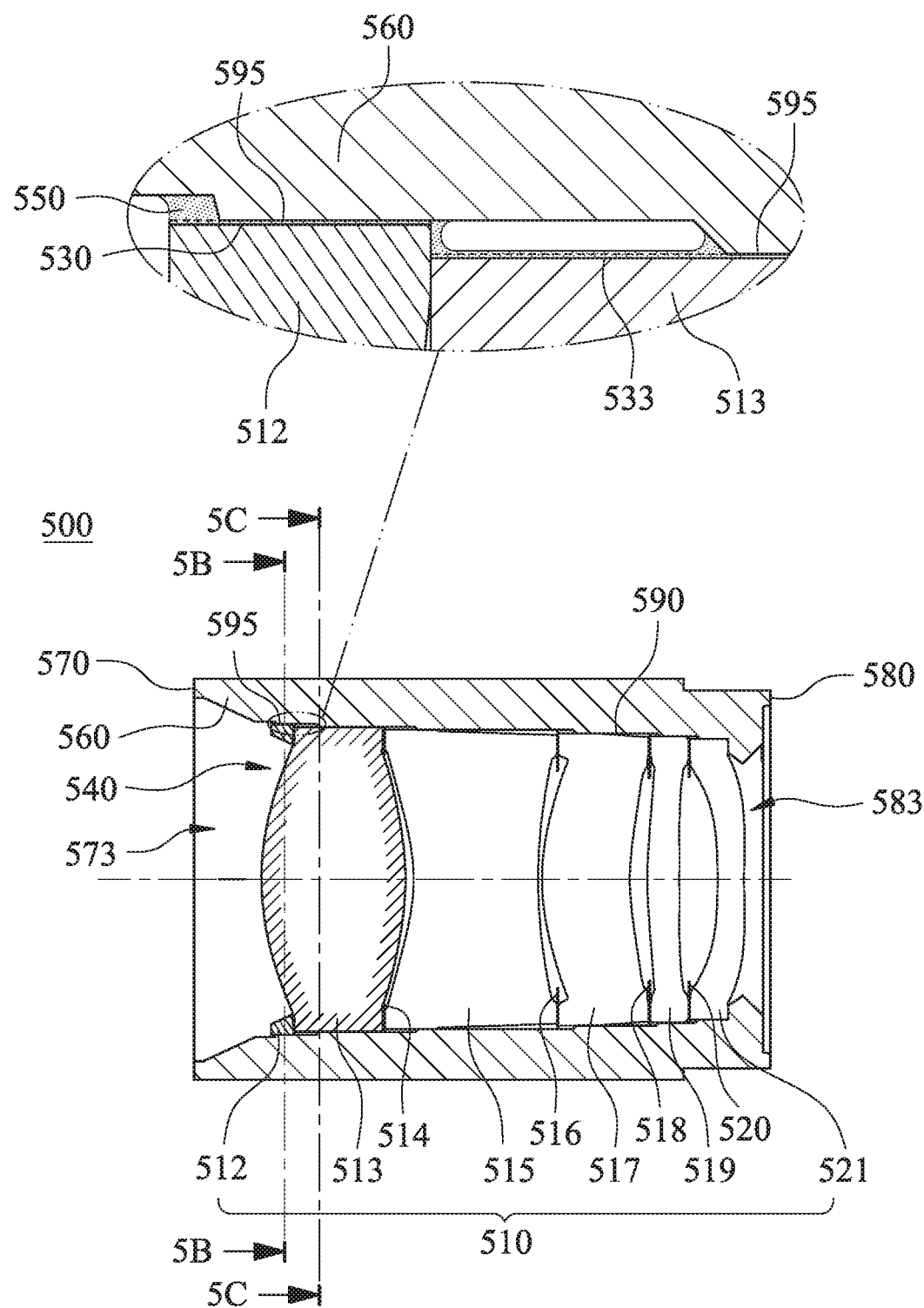
FIG. 5A is a schematic view of an imaging lens module according to the 5th embodiment of the present disclosure.
Figure 5B:
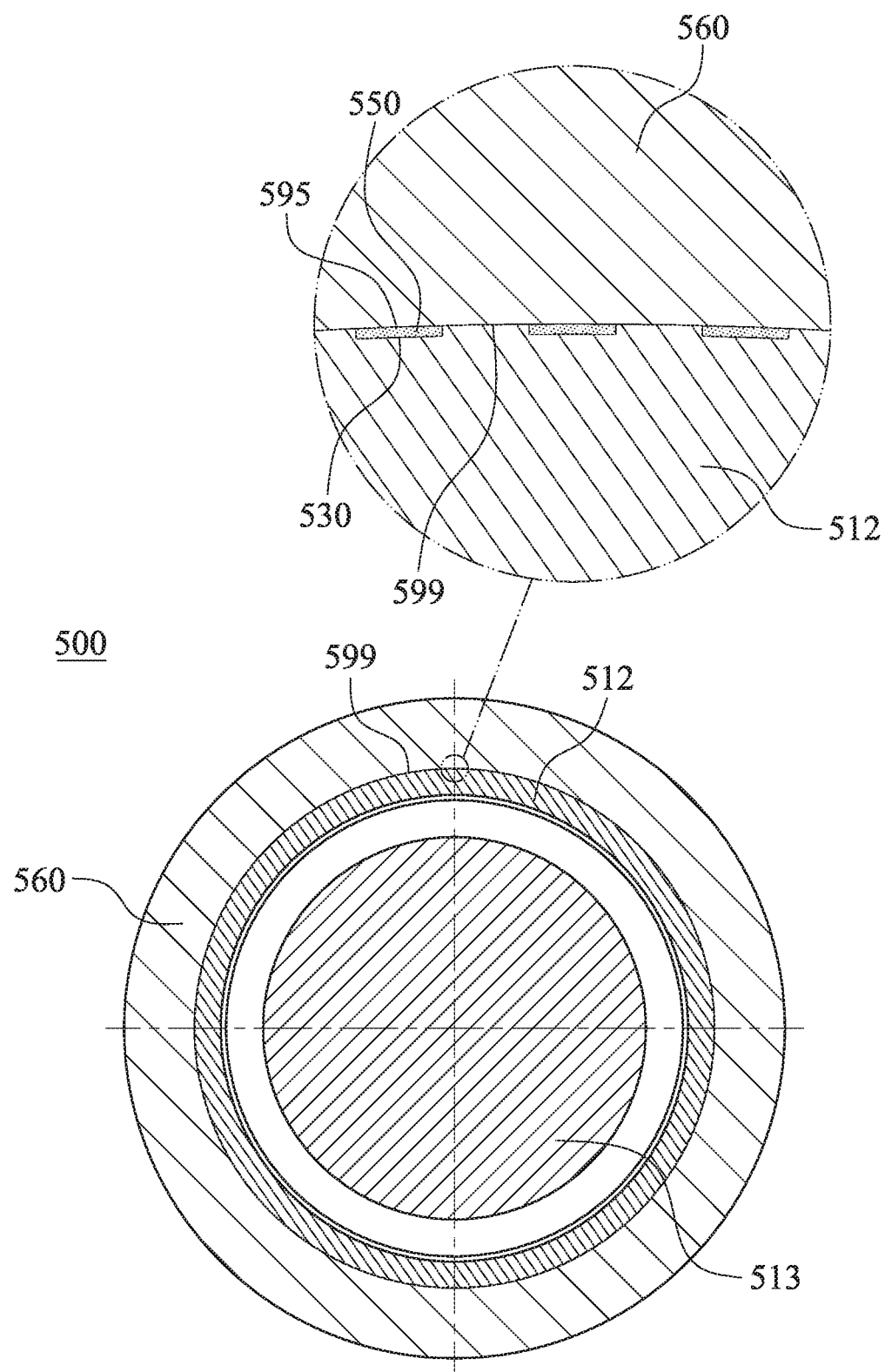
FIG. 5B is a cross-sectional view according to the cross-sectional line 5B-5B of FIG. 5A.
Figure 5C:
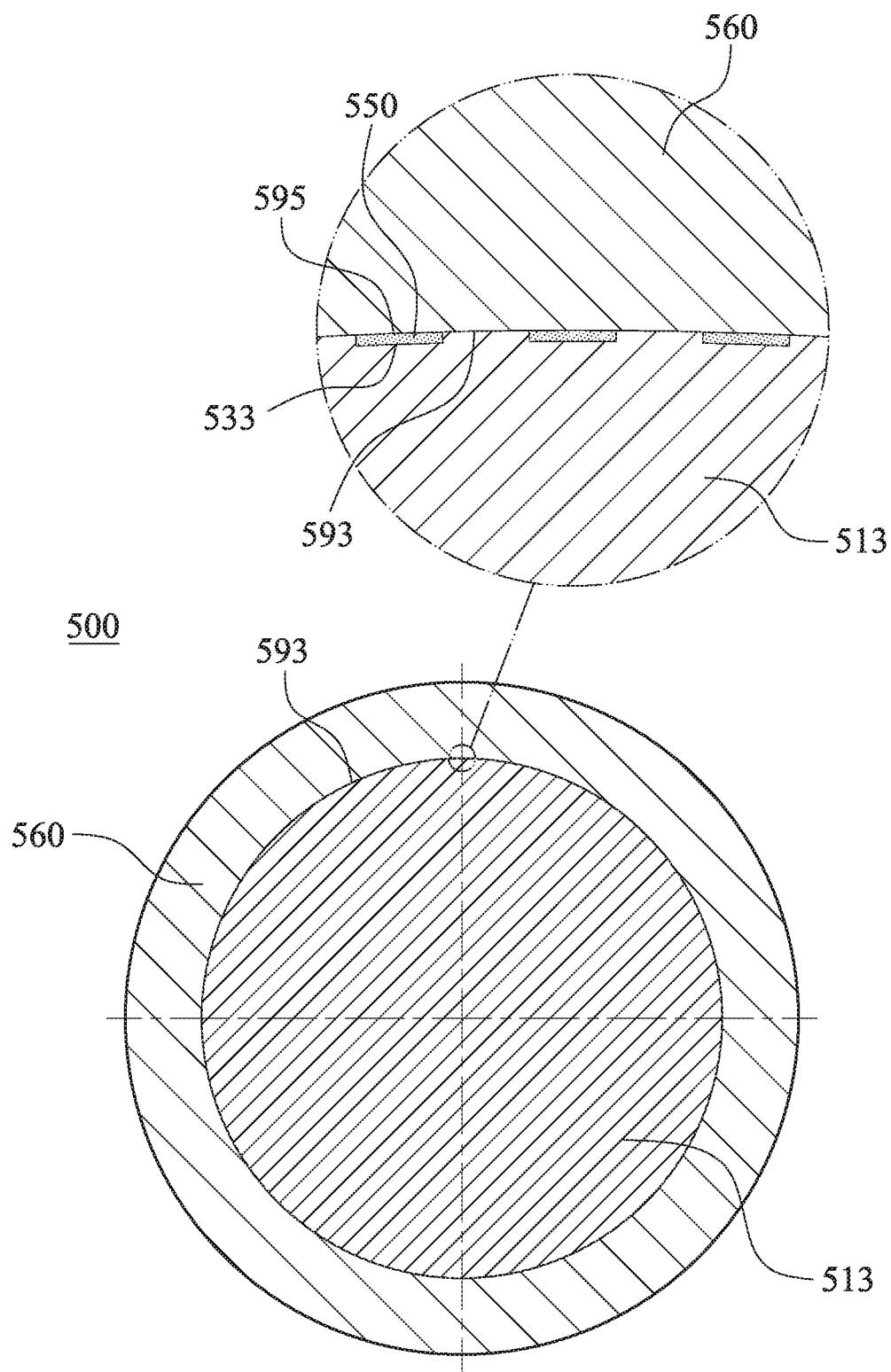
FIG. 5C is a cross-sectional view according to the cross-sectional line 5C-5C of FIG. 5A.

FIG. 5A is a schematic view of an imaging lens module 500 according to the 5th embodiment of the present disclosure, FIG. 5B is a cross-sectional view according to the cross-sectional line 5B-5B of FIG. 5A, and FIG. 5C is a cross-sectional view according to the cross-sectional line 5C-5C of FIG. 5A. In FIG. 5A to FIG. 5C, the imaging lens module 500 includes an optical lens assembly 510, a plastic barrel 560, and a glue material 550. The imaging lens module 500 can further include a filter (not shown) and an image surface (not shown).

Figure 5D:
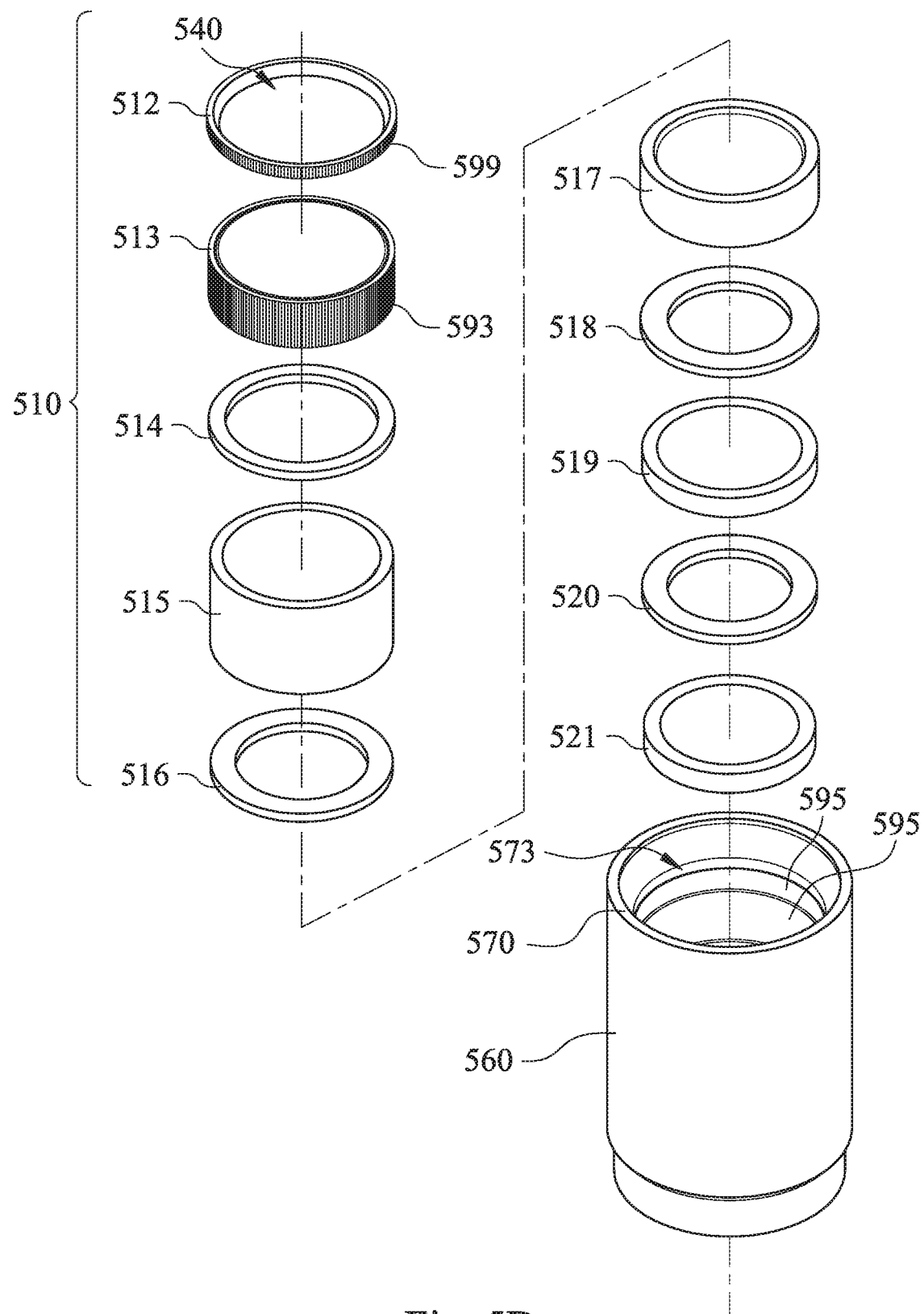
FIG. 5D is an exploded view of the plastic barrel and the optical lens assembly according to the 5th embodiment.

FIG. 5D is an exploded view of the plastic barrel 560 and the optical lens assembly 510 according to the 5th embodiment. In FIG. 5A and FIG. 5D, the optical lens assembly 510 includes a plurality of optical elements 512-521, and the optical elements 512-521 are disposed in the plastic barrel 560 and arranged along an optical axis of the imaging lens module 500. In the 5th embodiment, the optical lens assembly 510 includes, from an object side to an image side, the optical elements 512, 513, 514, 515, 516, 517, 518, 519, 520, and 521, and the optical elements 512-521 are disposed in the plastic barrel 560 and arranged along the optical axis, wherein the optical elements 513, 515, 517, 519, and 521 are lens elements, the optical elements 514, 516, 518, and 520 are light blocking sheets, and the optical element 512 is a spacer.

The plastic barrel 560 includes an outer object-end surface 570, an outer image-end surface 580, and an inner tube surface 590. The outer object-end surface 570 is a surface of the plastic barrel 560 facing an imaged object (not shown), and the outer object-end surface 570 surrounds an object-end opening 573. The outer image-end surface 580 is a surface of the plastic barrel 560 facing an image surface, and the outer image-end surface 580 surrounds an image-end opening 583. The inner tube surface 590 connects the outer object-end surface 570 and the outer image-end surface 580 and faces the optical axis of the imaging lens module 500. The inner tube surface 590 includes a plurality of parallel inner surfaces 595, and vertical distances between all locations of each of the parallel inner surfaces 595 and the optical axis are the same.

Figure 5E:
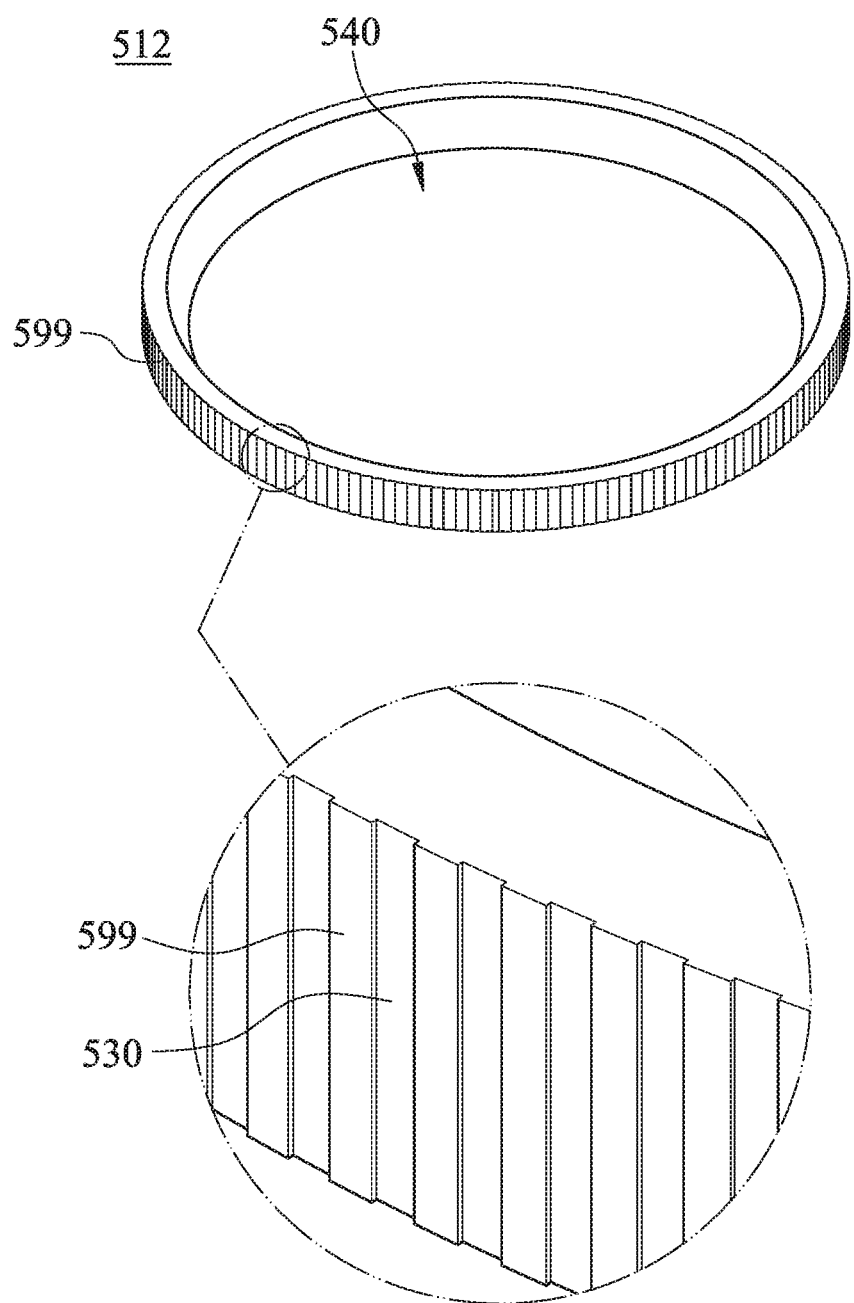
FIG. 5E is a 3-D view of the optical element according to the 5th embodiment.
Figure 5F:
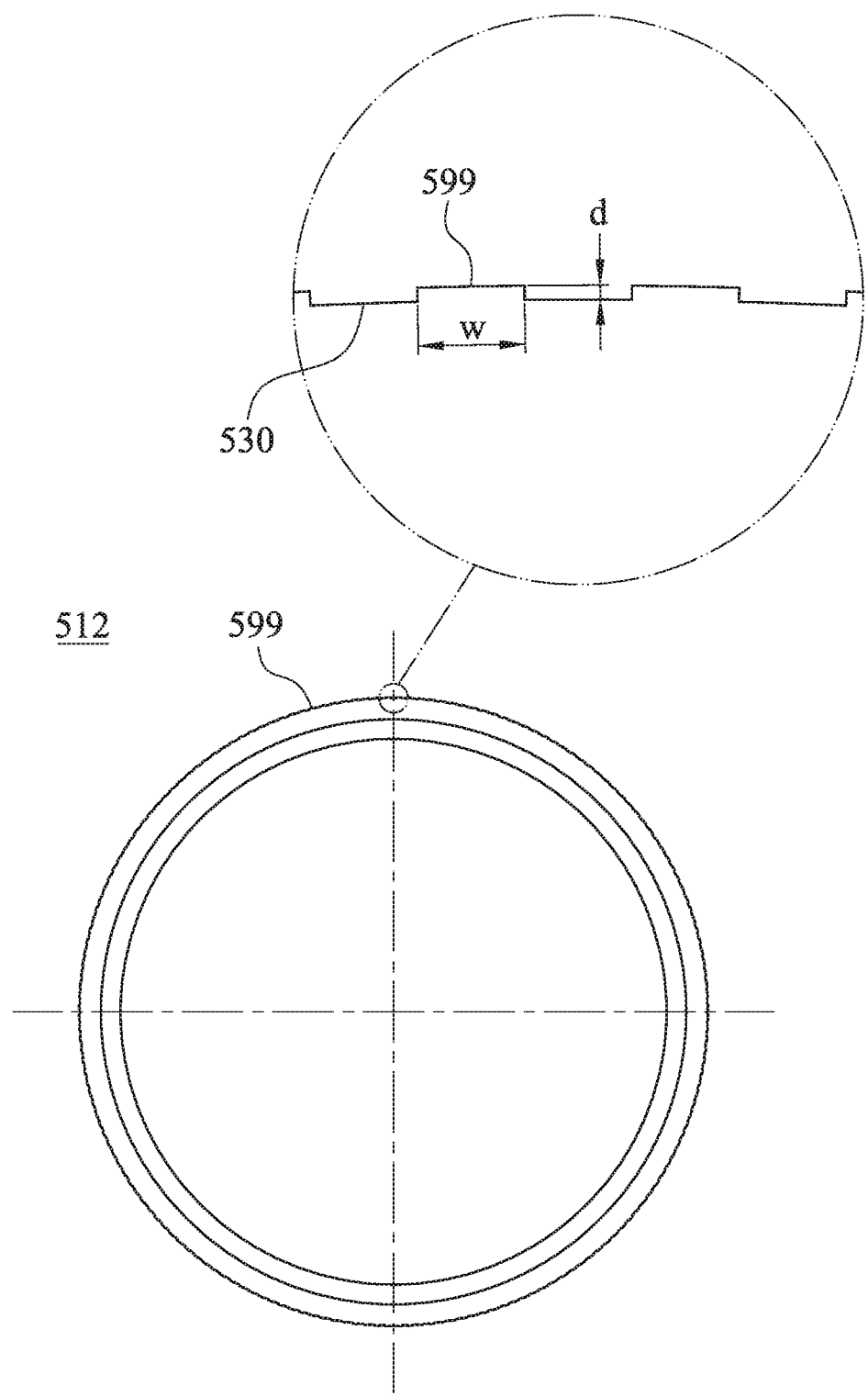
FIG. 5F is a plane view of FIG. 5E.

FIG. 5E is a 3-D view of the optical element 512 according to the 5th embodiment, and FIG. 5F is a plane view of FIG. 5E. A plurality of stripe structures 599 are disposed on and protruded from an outer annular surface 530 of the optical element 512 in the optical lens assembly 510, and the stripe structures 599 are regularly arranged along a circumferential direction of the outer annular surface 530.

According to the 5th embodiment of FIG. 5F, each of the stripe structures 599 protrudes from the outer annular surface 530 in an angle nearly vertical. Depending on the molding and release properties of the stripe structures 599, each of the stripe structures 599 can also protrude from the outer annular surface 530 in a round angle, or the outer annular surfaces 530 between the adjacent stripe structures 599 have an arc feature being slightly recessed. Alternatively, a cross-section of each of the stripe structures 599 appears to be a trapezoid with a wide bottom and a narrow top, but the disclosure is not limited thereto.

In FIG. 5B and FIG. 5D, one of the parallel inner surfaces 595 in the plastic barrel 560 is disposed correspondingly to the stripe structure 599, or it can also be said that the stripe structure 599 is disposed correspondingly to the aforementioned one of the parallel inner surfaces 595. The glue material 550 is applied among the one of the parallel inner surfaces 595 and the stripe structures 599, or it can also be said that the glue material 550 is applied among the one of the parallel inner surfaces 595, the stripe structures 599, and the outer annular surface 530, wherein the glue material 550 is an adhesive whose material is not limited. Accordingly, the application range control of the glue material 550 and the uniform application of the glue material 550 can be facilitated, and the demands of mass productions of the imaging lens module 500 can be satisfied. In addition, the appearance of the imaging lens module 500 can be prevented from being affected by the bumps caused by the partially overflowed glue material 550.

Figure 5G:
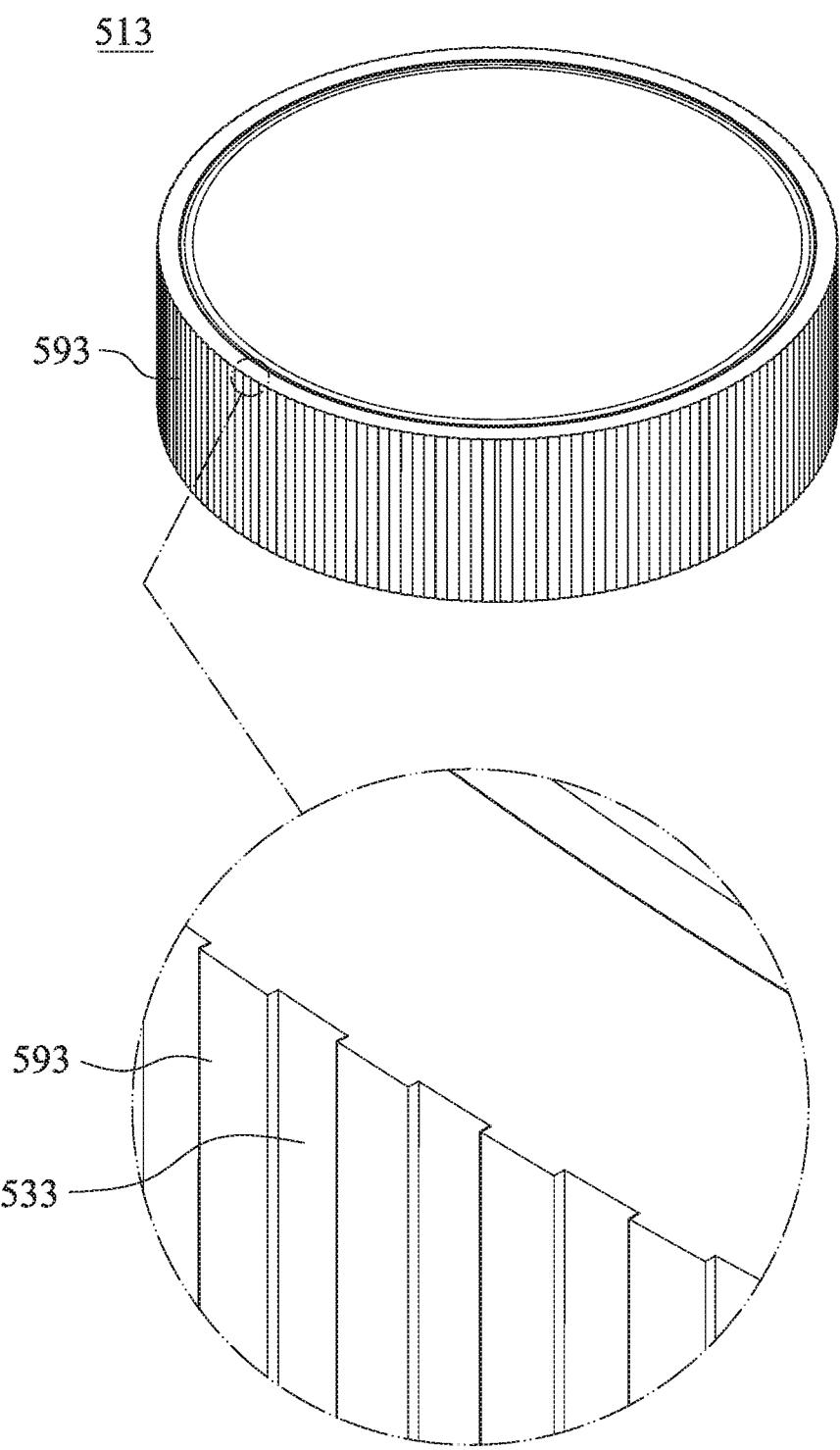
FIG. 5G is another 3-D view of the optical element in the 5th embodiment.
Figure 5H:
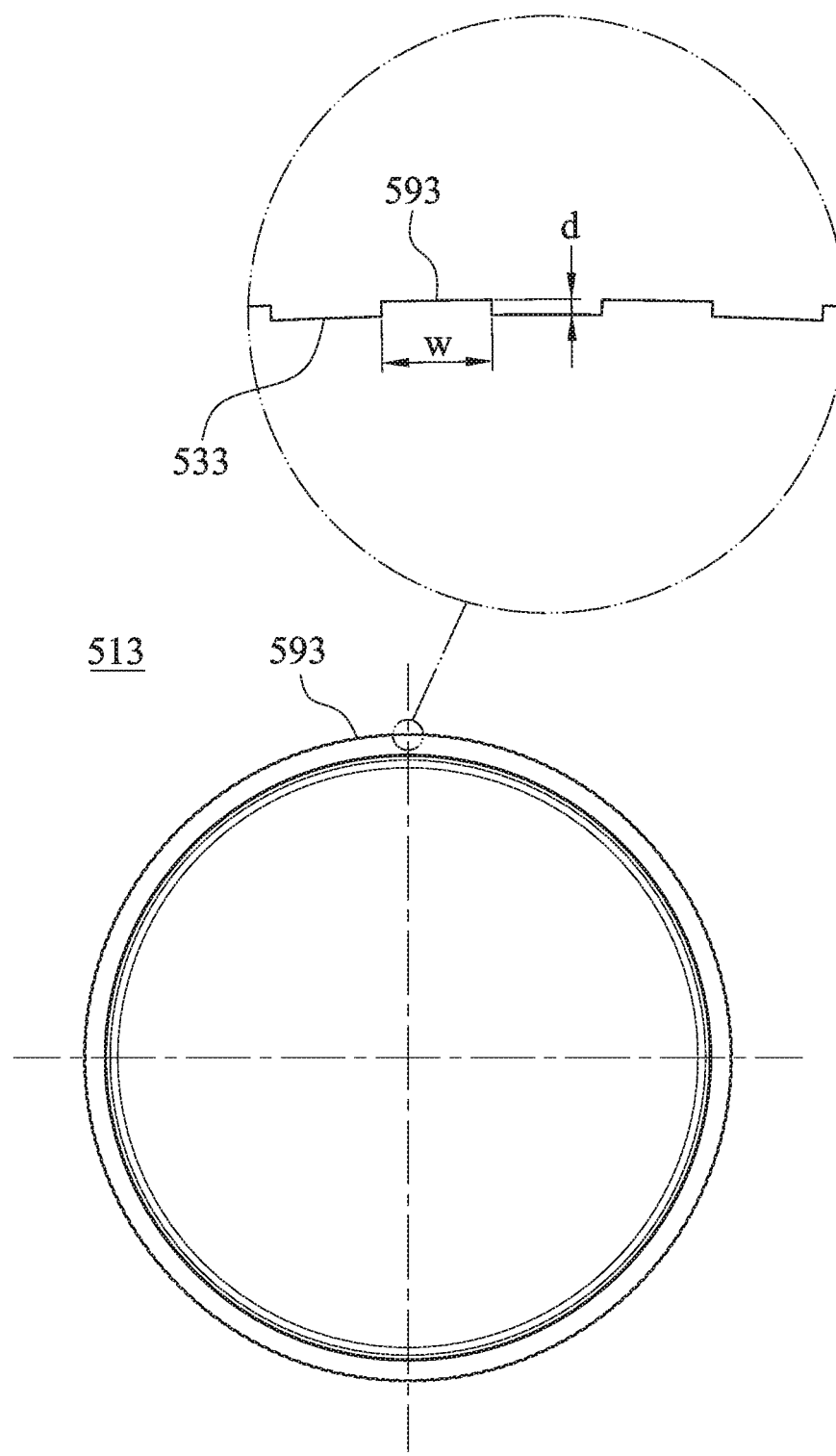
FIG. 5H is a plane view of FIG. 5G.

Moreover, FIG. 5G is another 3-D view of the optical element 513 according to the 5th embodiment, and FIG. 5H is a plane view of FIG. 5G. A plurality of the stripe structures 593 can be disposed on and protrude from the outer annular surface 533 of the optical element 513 in the optical lens assembly 510 in an angle nearly vertical, and the stripe structures 593 are regularly arranged along a circumferential direction of the outer annular surface 533.

In FIG. 5C and FIG. 5D, another of the parallel inner surfaces 595 in the plastic barrel 560 is disposed correspondingly to the stripe structures 593, or it can also be said that the stripe structures 593 are disposed correspondingly to the other of the parallel inner surfaces 595. The glue material 550 is applied among the other of the parallel inner surfaces 595 and the stripe structures 593, or it can also be said that the glue material 550 is applied among the other of the parallel inner surfaces 595, the stripe structures 593, and the outer annular surface 533.

Figure 5I:
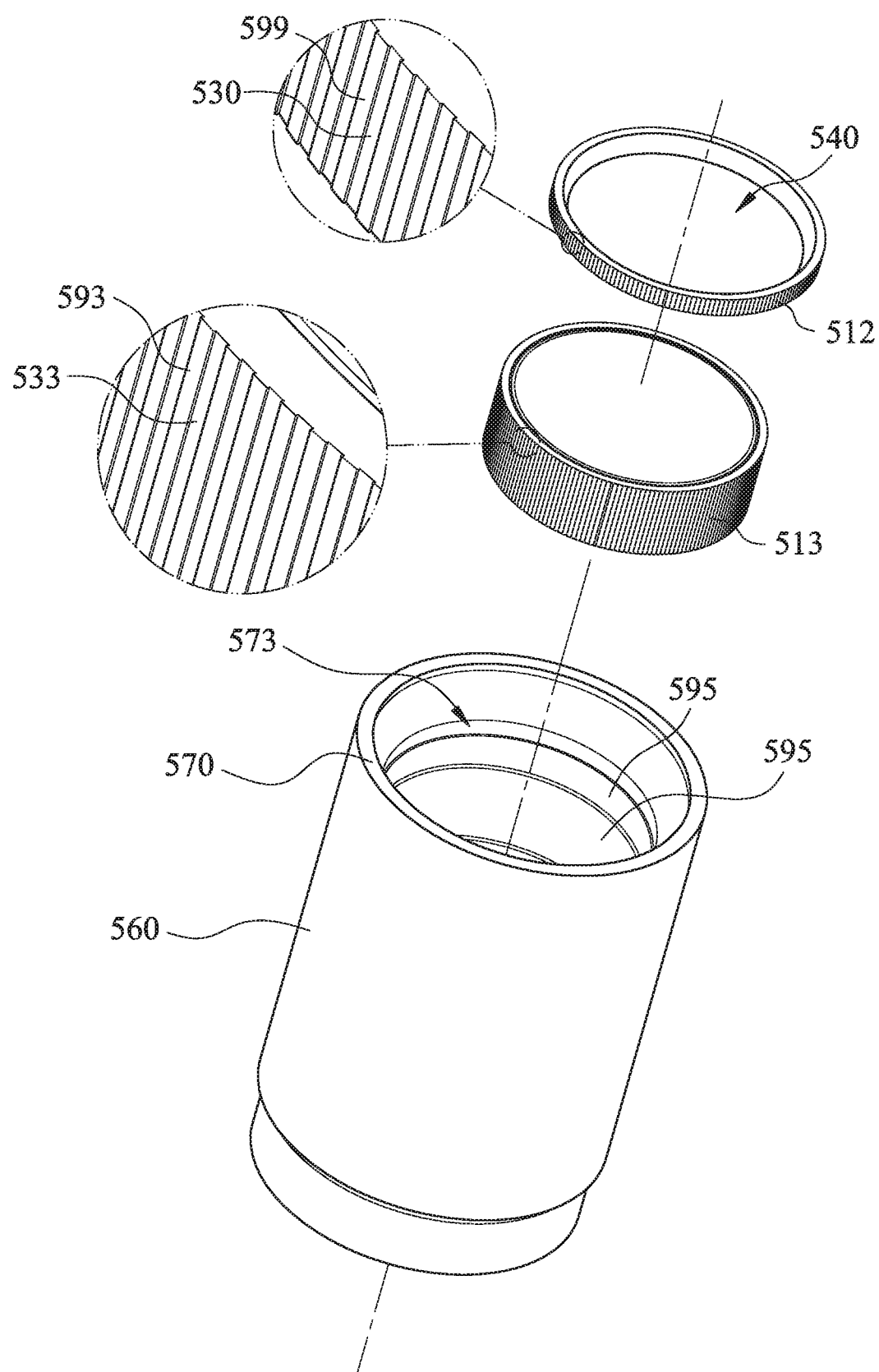
FIG. 5I is a schematic view of the stripe structures and the plastic barrel according to the 5th embodiment.

FIG. 5I is a schematic view of the stripe structures 593, 599, and the plastic barrel 560 according to the 5th embodiment. According to the 5th embodiment of FIG. 5A to FIG. 5C and FIG. 5I, the plurality of the stripe structures 599 and 593 are respectively disposed on and protruded from the outer annular surfaces 530 and 533 of two optical elements 512 and 513 in the optical lens assembly 510, and the aforementioned two parallel inner surfaces 595 are disposed correspondingly to the stripe structures 599 and 593, respectively. The glue material 550 is applied among the aforementioned two parallel inner surfaces 595 and the stripe structures 599 and 593. That is, the glue material 550 spreads from the space between the stripe structures 599 and the corresponding parallel inner surfaces 595 to the space between the stripe structures 593 and the corresponding parallel inner surfaces 595. Accordingly, the stripe structures 599 and 593 being respectively disposed on the outer annular surfaces 530 and 533 of the two optical elements 512 and 513 facilitate to absorb more glue material 550, such that the appearance of the imaging lens module 500 can be neater, and the yield of the appearance test can be improved.

In detail, in FIG. 5E to FIG. 5H, the stripe structures 599 and the optical element 512 can be formed integrally, and the stripe structures 593 and the optical element 513 can be formed integrally. Accordingly, the optical elements 512 and 513 can be applicable to mass productions. to The number of the stripe structures 599 on the outer annular surface 530 can range between 80 and 300, and the number of the strip structures 593 on the outer annular surface 533 ranges between 80 and 300. Accordingly, the stripe structures 599 and 593 being densely arranged facilitate the uniform application of the glue material 550.

In FIG. 5F and FIG. 5H, when a protruded height of any one of the stripe structures 599 is d, the following condition can be satisfied: 2 μm<d<15 μm; when a protruded height of any one of the stripe structures 593 is d, the following condition can be satisfied: 2 μm<d<15 μm. Accordingly, the stripe structures 599 and 593 have proper depths, and the mass productions and the dispensing quality can be balanced. In the 5th embodiment, the value of the parameter d of all of the stripe structures 599 and 593 can be the same or similar.

When a protruded height of any one of the stripe structures 599 is d, and a width of the any one of the stripe structures 599 is w, the following condition can be satisfied: 0<d/w<0.50; when a protruded height of any one of the stripe structures 593 is d, and a width of the any one of the stripe structures 593 is w, the following condition can be satisfied: 0<d/w<0.50. Accordingly, the stripe structures 599 and 593 being properly and densely arranged facilitate to reduce the manufacturing difficulty of the optical elements 512 and 513. In the 5th embodiment, the value of the parameter d of all of the stripe structures 599 and 593 can be the same or similar, the value of the parameter w can be the same or similar as well, and the spacing between any two of the adjacent stripe structures 599 and the spacing between any two of the adjacent stripe structures 593 can be the same or similar. Further, according to the imaging lens module of the present disclosure, the way of the stripe structures being regularly arranged along the circumferential direction of the parallel inner surface is not limited by the value of the parameter d, the value of the parameter w, and the spacing being the same or similar, but the stripe structures can be arranged periodically as well.

In FIG. 5A and FIG. 5E, the optical element 512 disposed with the stripe structures 599 is a spacer. The optical element 512 includes a hole 540. The optical axis of the imaging lens module 500 passes through the hole 540, and the hole 540 is an aperture stop of the optical lens assembly 510. Accordingly, it is applicable to the mechanical configuration of the lens assembly with long focal length (e.g., the imaging lens module 500).

In FIG. 5A and FIG. 5G, the optical element 513 disposed with the stripe structures 593 is a lens element. Accordingly, the number of the optical elements in the imaging lens module 500 and the cost can be reduced.

In FIG. 5A and FIG. 5D, the outer object-end surface 570 of the plastic barrel 560 can be closer to the optical element 512 disposed with the stripe structures 599 and the optical element 513 disposed with the stripe structures 593 than the outer image-end surface 580 is thereto. Accordingly, it is applicable to the mechanical configuration of the lens assembly with long back focal length (e.g., the imaging lens module 500).

In addition, in the 5th embodiment, a length direction of each of the stripe structures 599 and 593 is parallel to the optical axis of the imaging lens module 500. Each of the stripe structures 599 and 593 can respectively include a light diminishing surface (not labelled particularly). The parallel inner surfaces 595 disposed correspondingly to the stripe structures 599 contacts with at least one of the stripe structures 599, and the parallel inner surfaces 595 disposed correspondingly to the stripe structures 593 contacts with at least one of the stripe structures 593.

The following Table 5-1 and Table 5-2 respectively list the data defined according to the aforementioned parameters of the stripe structures 599 and 593 of the imaging lens modules 500 of the 5th embodiment as respectively illustrated in FIG. 5F and FIG. 5H.

TABLE 5-1

(the stripe structures 599 in the 5th embodiment)

| d (μm) | 5 | d/w | 0.133 |
|---|---|---|---|
| w (μm) | 37.61 | | |

TABLE 5-2

(the stripe structures 593 in the 5th embodiment)

| d (μm) | 5 | d/w | 0.133 |
|---|---|---|---|
| w (μm) | 37.61 | | |

6th Embodiment

Figure 6A:
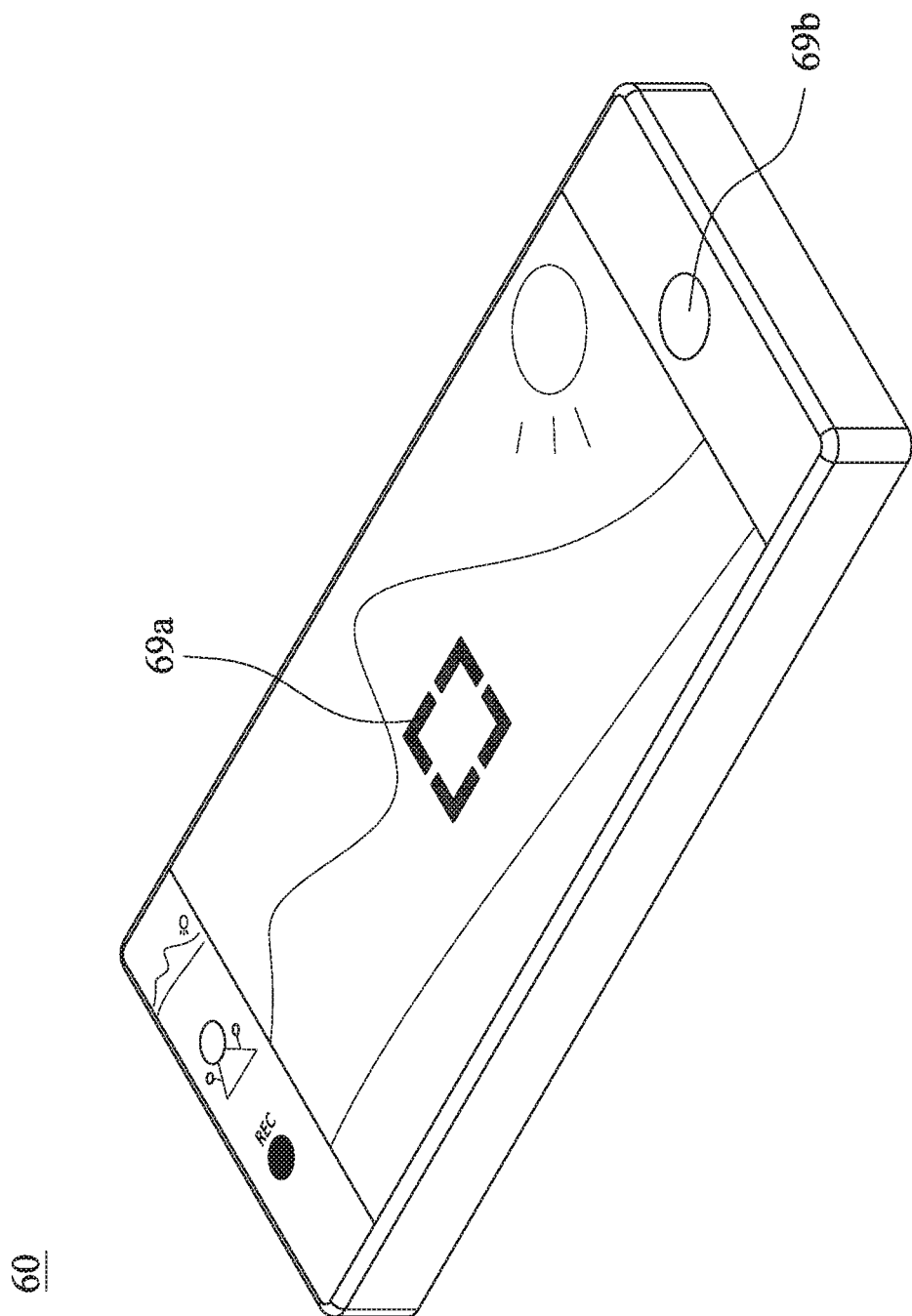
FIG. 6A is a schematic view of an electronic device according to the 6th embodiment of the present disclosure.
Figure 6B:
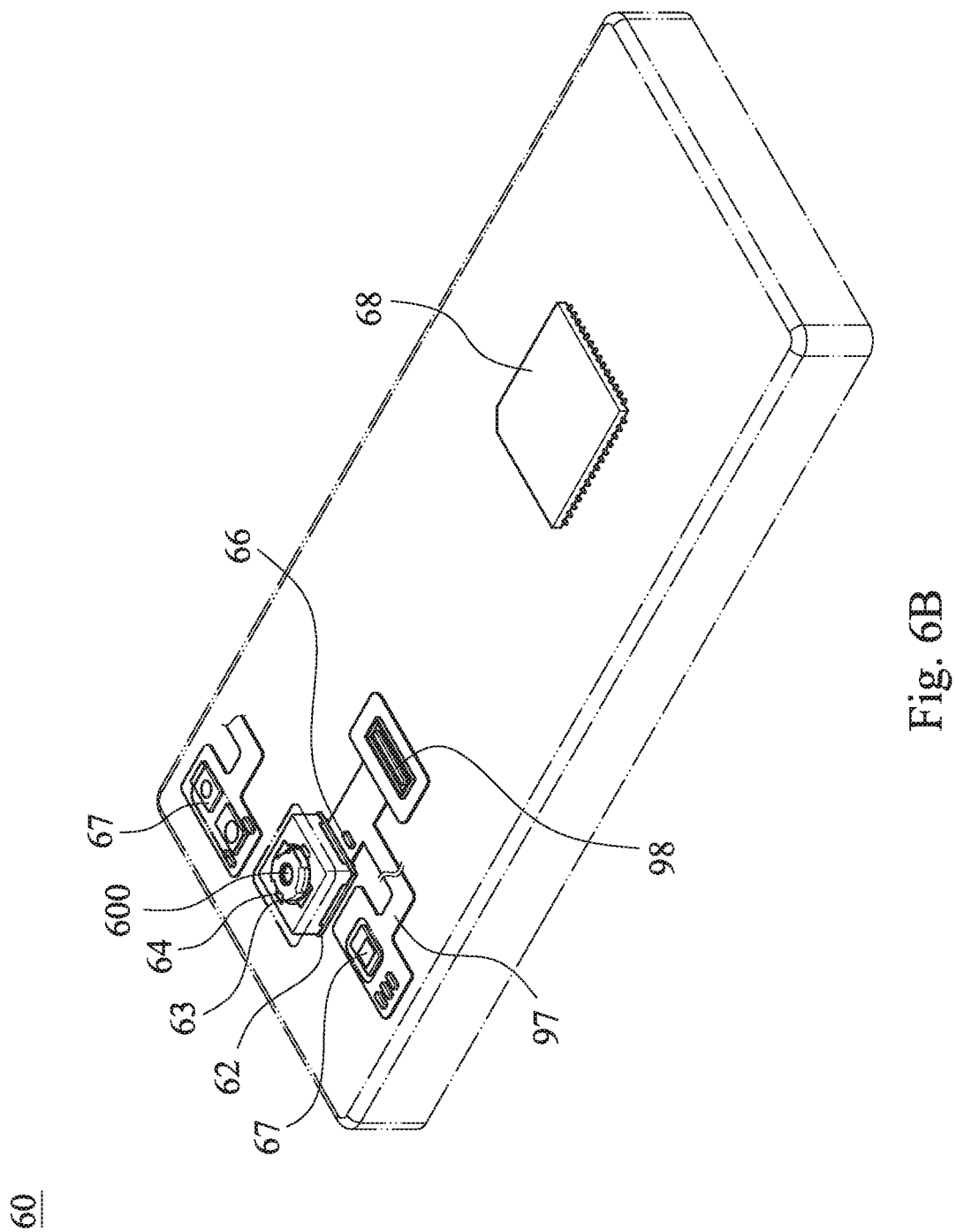
FIG. 6B is another schematic view of the electronic device according to the 6th embodiment of the present disclosure.

FIG. 6A is a schematic view of an electronic device 60 according to the 6th embodiment of the present disclosure, and FIG. 6B is another schematic view of the electronic device 60 according to the 6th embodiment of the present disclosure. In FIG. 6A and FIG. 6B, the electronic device 60 of the 6th embodiment is a smartphone. The electronic device 60 includes the imaging lens module 600 of the present disclosure and an image sensor 62, wherein the image sensor 62 is disposed on the image surface (not shown) of the imaging lens module 600. Accordingly, the demands of the current electronic device market to the mass productions and the appearances of the imaging lens module can be satisfied.

Specifically, a user activates a capturing mode via the user interface 69 of the electronic device 60, wherein the user interface 69 in the 6th embodiment can be a touch screen 69a and a button 69b, etc. At this time, the imaging lens module 600 converges the imaging light on the image sensor 62 and outputs the electronic signals associated with the image to the image signal processor (ISP) 68.

FIG. 6C is a block view of the electronic device 60 according to the 6th embodiment, in particular, the block view of the camera in the electronic device 60. In FIG. 6A to FIG. 6C, the electronic device 60 can further include an auto focus component 63 and an optical anti-shake component 64 in response to the camera specification of the electronic device 60. Moreover, the electronic device 60 can further include at least one auxiliary optical element 67 and at least one sensing element 66. The auxiliary optical element 67 can be flash modules, infrared distance measurement components, laser focus modules and modules for compensating for color temperatures. The sensing element 66 can have functions for sensing physical momentum and kinetic energies, such as an accelerator, a gyroscope, and a hall effect element, to sense shaking or jitters applied by hands of the user or external environments. As a result, the auto focus component 63 and the optical anti-shake component 64 disposed on the electronic device 60 can function to obtain great imaging qualities and facilitate the electronic device 60 according to the present disclosure to have a capturing function with multiple modes, such as taking optimized selfies, high dynamic range (HDR) with a low light source, 4K resolution recording, etc. Additionally, the user can visually see the captured image of the camera through the touch screen and manually operate the view finding range on the touch screen to achieve the auto focus function of what you see is what you get.

Furthermore, in FIG. 6B, the imaging lens module 600, the image sensor 62, the auto focus component 63, the optical anti-shake component 64, the sensing element 66, and the auxiliary optical element 67 can be disposed on a flexible printed circuitboard (FPC) 97 and electrically connected with the associated elements, such as an imaging signal processing element 68, via a connector 98 to perform a capturing process. Since the current electronic devices, such as smartphones, have a tendency of being light and thin, the way of firstly disposing the imaging lens module and related elements on the flexible printed circuitboard and secondly integrating the circuit into the main board of the electronic device via the connector can satisfy the mechanical design of the limited space inside the electronic device and the layout requirements and obtain more margins. The auto focus function of the imaging lens module can be controlled more flexibly via the touch screen of the electronic device. In the 6th embodiment, the electronic device 60 includes a plurality of sensing elements 66 and a plurality of auxiliary optical elements 67. The sensing elements 66 and the auxiliary optical elements 67 are disposed on the flexible printed circuitboard 97 and at least one other flexible printed circuitboard (not labelled particularly) and electrically connected with the associated elements, such as an imaging signal processing element 68, via corresponding connectors to perform a capturing process. In other embodiments (not shown), the sensing elements and the auxiliary optical elements can also be disposed on the main board of the electronic device or carrier boards in other forms according to requirements of the mechanical design and the circuit layout.

In addition, the electronic device 60 can further include, but not be limited to, a display, a control unit, a storage unit, a random access memory, a read-only memory, or the combination thereof.

7th Embodiment

Figure 7:
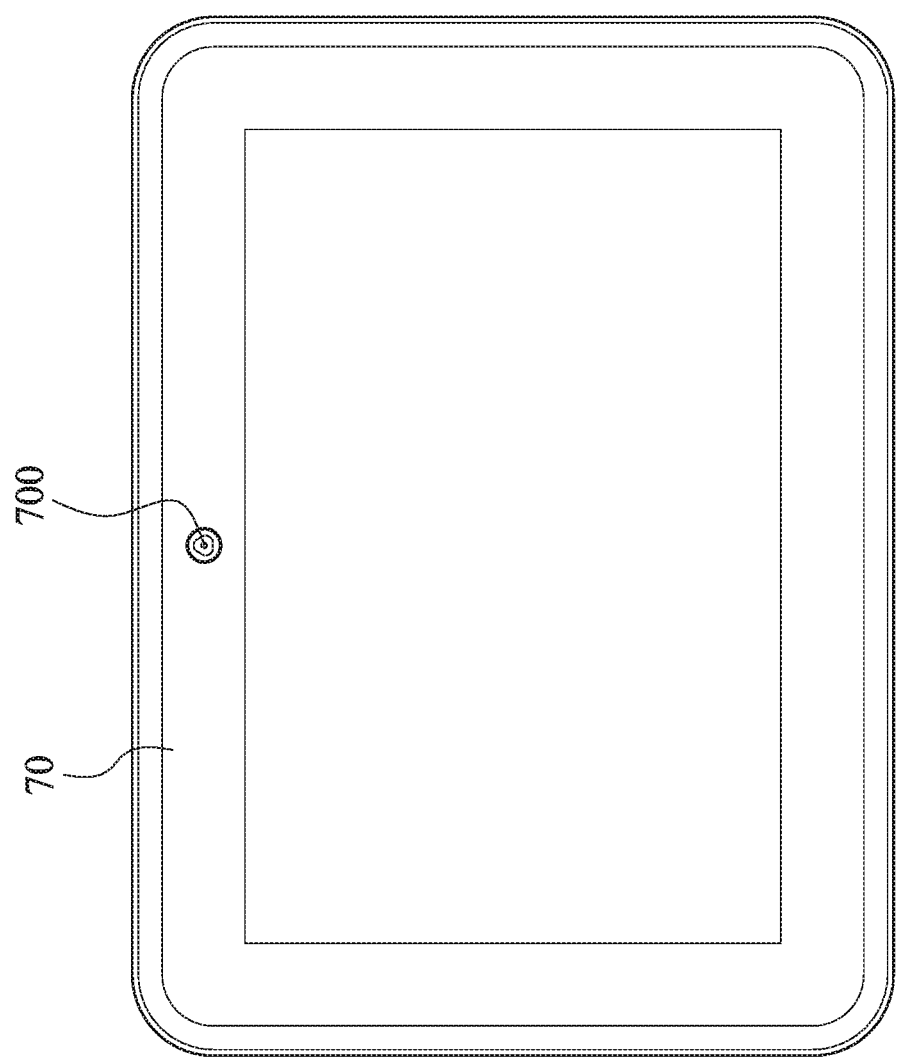
FIG. 7 is a schematic view of an electronic device according to the 7th embodiment of the present disclosure.

FIG. 7 is a schematic view of an electronic device 70 according to the 7th embodiment of the present disclosure. The electronic device 70 of the 7th embodiment is a tablet, and the electronic device 70 includes an imaging lens module 700 according to the present disclosure and an image sensor (not shown), wherein the image sensor is disposed on an image surface (not shown) of the imaging lens module 700.

8th Embodiment

Figure 8:
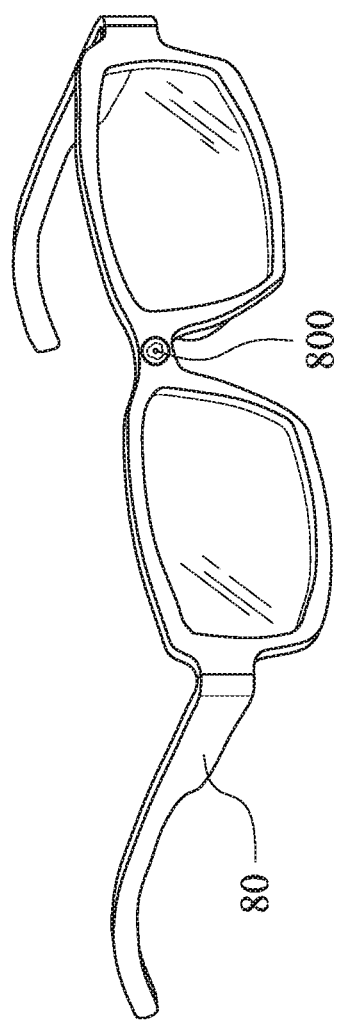
FIG. 8 is a schematic view of an electronic device according to the 8th embodiment of the present disclosure.

FIG. 8 is a schematic view of an electronic device 80 according to the 8th embodiment of the present disclosure.

The electronic device 80 of the 8th embodiment is a wearable device, and the electronic device 80 includes an imaging lens module 800 according to the present disclosure and an image sensor (not shown), wherein the image sensor is disposed on an image surface (not shown) of the imaging lens module 800.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An imaging lens module, comprising:
    a plastic barrel, comprising:
        an outer object-end surface being a surface of the plastic barrel facing an imaged object, and the outer object-end surface surrounding an object-end opening;
        an outer image-end surface being a surface of the plastic barrel facing an image surface, and the outer image-end surface surrounding an image-end opening; and
        an inner tube surface connecting with the outer object-end surface and the outer image-end surface and facing an optical axis of the imaging lens module, wherein the inner tube surface comprises a plurality of parallel inner surfaces, a plurality of stripe structures are disposed on and protruded from at least one of the parallel inner surfaces, and the stripe structures are regularly arranged along a direction orthogonal to the optical axis of the imaging lens module;
    an optical lens assembly comprising a plurality of optical elements disposed in the plastic barrel and arranged along the optical axis, wherein an outer annular surface of at least one of the optical elements is disposed correspondingly to the stripe structures; and
    a glue material applied among the outer annular surface and the stripe structures;
    wherein the outer image-end surface is closer to the at least one of the optical elements disposed correspondingly to the stripe structures than the outer object-end surface is to the at least one of the optical elements disposed correspondingly to the stripe structures.

2. The imaging lens module of claim 1, wherein the stripe structures are integrally formed with the plastic barrel.

3. The imaging lens module of claim 2, wherein the outer annular surface of the at least one of the optical elements disposed correspondingly to the stripe structures contacts with at least one of the stripe structures.

4. The imaging lens module of claim 2, wherein the stripe structures are merely disposed on one of the parallel inner surfaces.

5. The imaging lens module of claim 2, wherein a length direction of each of the stripe structures is parallel to the optical axis.

6. The imaging lens module of claim 2, wherein a number of the stripe structures on the parallel inner surfaces ranges between 80 and 300.

7. The imaging lens module of claim 2, wherein a protruded height of any one of the stripe structures is d, and the following condition is satisfied:

$$2 \; \mu m < d < 30 \; \mu m.$$

8. The imaging lens module of claim 7, wherein the protruded height of any one of the stripe structures is d, and the following condition is satisfied:

$$2 \; \mu m < d < 15 \; \mu m.$$

9. The imaging lens module of claim 2, wherein a protruded height of any one of the stripe structures is d, a width of the any one of the stripe structures is w, and the following condition is satisfied:

$$0 < d/w < 0.50.$$

10. The imaging lens module of claim 9, wherein the protruded height of the any one of the stripe structures is d, the width of the any one of the stripe structures is w, and the following condition is satisfied:

$$0 < d/w < 0.35.$$

11. The imaging lens module of claim 2, wherein the at least one of the optical elements disposed correspondingly to the stripe structures comprises a lens element.

12. The imaging lens module of claim 2, wherein the at least one of the optical elements disposed correspondingly to the stripe structures comprises a hole.

13. The imaging lens module of claim 2, wherein a location of a maximum outer diameter of the plastic barrel is adjacent to the outer image-end surface, and the maximum outer diameter of the plastic barrel is greater than a distance parallel to the optical axis between the outer object-end surface and the outer image-end surface.

14. An electronic device, comprising:
    the imaging lens module of claim 1; and
    an image sensor disposed on the image surface of the imaging lens module.

15. An imaging lens module, comprising:
    a plastic barrel, comprising:
        an outer object-end surface being a surface of the plastic barrel facing an imaged object, and the outer object-end surface surrounding an object-end opening;
        an outer image-end surface being a surface of the plastic barrel facing an image surface, and the outer image-end surface surrounding an image-end opening; and
        an inner tube surface connecting with the outer object-end surface and the outer image-end surface and facing an optical axis of the imaging lens module, wherein the inner tube surface comprises a plurality of parallel inner surfaces, a plurality of stripe structures are disposed on and protruded from at least one of the parallel inner surfaces, and the stripe structures are regularly arranged along a direction orthogonal to the optical axis of the imaging lens module;
    an optical lens assembly comprising a plurality of optical elements disposed in the plastic barrel and arranged along the optical axis, wherein an outer annular surface of at least one of the optical elements is disposed correspondingly to the stripe structures; and
    a glue material applied among the outer annular surface and the stripe structures;
    wherein the outer object-end surface is closer to the at least one of the optical elements disposed correspondingly to the stripe structures than the outer image-end surface is to the at least one of the optical elements disposed correspondingly to the stripe structures.

16. The imaging lens module of claim 15, wherein the stripe structures are integrally formed with the plastic barrel.

17. The imaging lens module of claim 16, wherein a protruded height of any one of the stripe structures is d, and the following condition is satisfied:

$2 \ \mu m < d < 15 \ \mu m.$

18. The imaging lens module of claim 16, wherein a protruded height of any one of the stripe structures is d, a width of the any one of the stripe structures is w, and the following condition is satisfied:

$0 < d/w < 0.50.$

19. The imaging lens module of claim 16, wherein a number of the stripe structures on the outer annular surface ranges between 80 and 300.

20. The imaging lens module of claim 16, wherein the at least one of the optical elements disposed correspondingly to the stripe structures comprises a lens element.

21. An electronic device, comprising:
the imaging lens module of claim 15; and
an image sensor disposed on the image surface of the imaging lens module.

* * * * *